(12) United States Patent
Kmiecik et al.

(10) Patent No.: US 9,891,059 B2
(45) Date of Patent: Feb. 13, 2018

(54) ROUTE SMOOTHING

(75) Inventors: Marcin Michal Kmiecik, Lodz (PL); Rafal Jan Gliszczynski, Lodz (PL)

(73) Assignee: TOMTOM GLOBAL CONTENT B.V., Amsterdam (NL)

( * ) Notice: Subject to any disclaimer, the term of this patent is extended or adjusted under 35 U.S.C. 154(b) by 0 days.

(21) Appl. No.: 14/344,640

(22) PCT Filed: Sep. 13, 2012

(86) PCT No.: PCT/EP2012/067896
§ 371 (c)(1),
(2), (4) Date: Mar. 13, 2014

(87) PCT Pub. No.: WO2013/037860
PCT Pub. Date: Mar. 21, 2013

(65) Prior Publication Data
US 2014/0350850 A1    Nov. 27, 2014

(30) Foreign Application Priority Data
Sep. 13, 2011 (EP) ..................... 11461537

(51) Int. Cl.
*G01C 21/34* (2006.01)
*G01C 21/00* (2006.01)
(Continued)

(52) U.S. Cl.
CPC ....... *G01C 21/3407* (2013.01); *G01C 21/005* (2013.01); *G01C 22/006* (2013.01); *G01S 19/19* (2013.01); *G01S 19/49* (2013.01)

(58) Field of Classification Search
USPC .................................. 701/400–541
See application file for complete search history.

(56) References Cited

U.S. PATENT DOCUMENTS 6,345,232 B1 * 2/2002 Lynch et al. .................. 701/479
6,614,394 B2    9/2003 Honda et al.
(Continued)

FOREIGN PATENT DOCUMENTS

CN    1316652 A    10/2001
EP    2264485 A1   12/2010
(Continued)

OTHER PUBLICATIONS

International Search Report of Nov. 30, 2012 for International Application No. PCT/EP2012/067896.
(Continued)

*Primary Examiner* — Hussein Elchanti

(57) ABSTRACT

A method is disclosed involving receiving GPS data from a personal portable training device. A smoothing operation is performed on the GPS data to generate a more accurate representation of the route travelled for display to a user (504). In the smoothing operation, a cubic spline algorithm is used to obtain an initial estimate of the route representation (500). The estimate is then subjected to a refinement using at least received user motion data recorded by the personal training device (502). In addition one or more of: data indicative of the GPS accuracy; historical route data; and digital map data, such as building footprints and bodies of water, may be used in refining the estimate.

16 Claims, 6 Drawing Sheets

(51) Int. Cl.
*G01S 19/19* (2010.01)
*G01S 19/49* (2010.01)
*G01C 22/00* (2006.01)

(56) References Cited

U.S. PATENT DOCUMENTS

| | | | |
|---|---|---|---|
| 8,214,139 B2 | 7/2012 | Yonker | |
| 8,706,401 B2* | 4/2014 | Lee | 701/410 |
| 8,718,858 B2* | 5/2014 | Al-Mahnna | 701/23 |
| 8,812,232 B2* | 8/2014 | Nurminen et al. | 701/490 |
| 2004/0046692 A1 | 3/2004 | Robson et al. | |
| 2006/0155464 A1 | 7/2006 | Smartt | |
| 2008/0082254 A1 | 4/2008 | Huhtala et al. | |
| 2010/0191461 A1 | 7/2010 | Zeng | |
| 2010/0292886 A1 | 11/2010 | Szczerba et al. | |
| 2010/0324819 A1 | 12/2010 | Nurminen et al. | |
| 2011/0241935 A1* | 10/2011 | Miocinovic et al. | 342/357.31 |
| 2013/0196688 A1* | 8/2013 | Lu et al. | 455/456.1 |
| 2014/0046990 A1* | 2/2014 | Kmiecik et al. | 708/203 |
| 2014/0073357 A1* | 3/2014 | Johnson | 455/456.3 |

FOREIGN PATENT DOCUMENTS

| | | |
|---|---|---|
| JP | H0785288 A | 3/1995 |
| JP | 2000321086 A | 11/2000 |
| JP | 2007333652 A | 12/2007 |
| JP | 2009063555 A | 3/2009 |
| JP | 2011512520 A | 4/2011 |
| WO | 2010075879 A1 | 7/2010 |
| WO | 2010111118 A1 | 9/2010 |
| WO | 2012045484 A1 | 4/2012 |

OTHER PUBLICATIONS

European Search Report of Apr. 4, 2012 for European Application No. EP11461537.0.

* cited by examiner

ROUTE SMOOTHING

CROSS-REFERENCES TO RELATED APPLICATIONS

This application is the National Stage of International Application No. PCT/EP2012/067896, filed on Sep. 13, 2012 and designating the United States. The application claims the benefit of European Patent Application No. 11461537.0 filed Sep. 13, 2011. The entire contents of both these applications are incorporated herein by reference.

FIELD OF THE INVENTION

This invention relates to methods and systems for smoothing position data relating to a route travelled by a user in order to generate a more accurate representation of the route. The present invention is particularly, although not exclusively, applicable to the smoothing of route data received from portable training devices, e.g. devices that can be worn by runners, cyclists, etc, which can track and record the pace of the user at particular moments during a workout and/or the distance covered by the user during the workout.

BACKGROUND OF THE INVENTION

Portable navigation devices (PNDs) that include GNSS (Global Navigation Satellite Systems) signal reception and processing functionality are well known and are widely employed as in-car or other vehicle navigation systems. Such devices include a GNSS antenna, such as a GPS antenna, by means of which satellite-broadcast signals, including location data, can be received and subsequently processed to determine a current location of the device. The PND device may also include electronic gyroscopes and accelerometers which produce signals that can be processed to determine the current angular and linear acceleration, and in turn, and in conjunction with location information derived from the GPS signal, velocity and relative displacement of the device and this vehicle in which it is typically mounted. Such sensors are most commonly provided in in-vehicle navigation systems, but may also be provided in the PND device itself.

In recent years, GPS has started to be used for pedestrian and outdoor applications. For example, sports watches that include GPS antennas have started to be used by joggers, runners, cyclists and other athletes and outdoor enthusiasts as a means to obtain real-time data of their speed, distance travelled, etc. The GPS data is also typically stored on such devices such that it can be analysed after the athlete has finished their activity, e.g. in some cases by transferring the collected data to a computer or website to be displayed on a digital map.

In conventional PNDs, vehicle speed and distance is often calculated using the measured ground speed of the vehicle obtained from the GNSS signals, and more specifically derived from the carrier phase tracking loops. For example, the distance travelled by the vehicle between two epochs (or specific instants in time when an updated GPS signal is received) can be calculated by integrating, either numerical or vector as appropriate, the vehicle's velocity vector over time. The well-known errors experienced with GPS signals, such as the multi-path effect, can also often be mitigated or at least reduced in vehicle navigation through various filtering techniques, such as Kalman filtering and map matching.

As will be easily appreciated, the dynamical behavior of pedestrians and other outdoor enthusiasts is very different from that of vehicles. For example, vehicles are limited in most circumstances to travel on a set road network, and thus will usually only experience limited and predictable changes in direction. In contrast, pedestrians, cyclists, etc. have no such restrictions (or are at least subject to significantly fewer restrictions) and thus have more complex dynamical movements. Furthermore, in dense urban environments, pedestrians will also often walk on pavements (or sidewalks), and thus will typically be closer to buildings than vehicles. This has the effect of reducing satellite visibility, thereby degrading horizontal dilution of precision (HDOP).

In view of these differences in dynamical behavior, there can be some difficulties in obtaining an accurate representation of a route followed by such a device, and hence by the user thereof. It would therefore be desirable to provide a method for providing a more accurate representation of a route travelled by a user of a device, particular one having location determining and tracking capability, such as a portable training device.

SUMMARY OF THE INVENTION

In accordance with a first aspect of the invention there is provided a method of generating a representation of a travelled route, comprising the steps of:

receiving position data relating to the position of a user at a plurality of times when travelling along a route;

receiving user motion data relating to the motion of the user at a plurality of times when travelling along the route; and performing a smoothing operation on the position data to generate a more accurate representation of the route travelled, wherein the smoothing operation comprises:

applying a spline algorithm to the received position data to obtain an estimated representation of the route in the form of a spline curve; and refining the estimated representation of the route using the received user motion data.

In accordance with a further aspect of the invention there is provided a system, optionally a server, for generating a representation of a travelled route, comprising:

means for receiving position data relating to the position of a user at a plurality of times when travelling along a route;

means for receiving user motion data relating to the motion of the user at a plurality of times when travelling along the route; and means for performing a smoothing operation on the position data to generate a more accurate representation of the route travelled, wherein the means for performing a smoothing operation comprises:

means for applying a spline algorithm to the received position data to obtain an estimated representation of the route in the form of a spline curve; and means for refining the estimated representation of the route using the received user motion data.

The present invention in this further aspect may include any or all of the features described in relation to the first aspect of the invention, and vice versa, to the extent that they are not mutually inconsistent. Thus, if not explicitly stated herein, the system of the present invention may comprise means for carrying out any of the steps of the method described.

The means for carrying out any of the steps of the method may comprise a set of one or more processors for so doing. A given step may be carried out using the same or a different set of processors to any other step. Any given step may be carried out using a combination of sets of processors.

According to the present invention in any of its aspects therefore, position data is received and subjected to a smoothing operation in order to generate a more accurate representation of the route travelled ("a smoothed route"). The term "smoothed route" herein refers to the result of the smoothing operation i.e. the more accurate representation of the smoothed route, which may be output to a user, rather than any intermediate smoothed route. The smoothing operation is based on the received position data and additional data comprising received user motion data. The additional data is additional to the received position data. Unless the context demands otherwise, references to "the additional data" herein refer to the received user motion data. In some embodiments the additional data upon which the smoothing operation is based may also include one or more of: data relating to the accuracy of the received position data; historical route data; and digital map data.

In accordance with the invention in any of its aspects or embodiments, the received position data may be received in any suitable manner. The data may be received via any suitable communications link. The link may be a wireless link or a wired link or may comprise combinations thereof. For example, the data may be received via the Internet or over the air.

The received position data may be received from any suitable source or sources. In preferred embodiments the position data is received from location determining and tracking means of a device. The location determining and tracking means may be arranged to determine and track the location of the device. The device is thus preferably a mobile or portable device. The location determining and tracking means could be of any type. For example, latitude and longitude coordinates could be determined using a device that can access and receive information from WiFi access points or cellular communication networks. Preferably, however, the location determining and tracking means comprises a global navigation satellite systems (GNSS) receiver, such as a GPS receiver, for receiving satellite signals indicating the position of the receiver (and thus user) at a particular point in time, and which receives updated position information at regular intervals. In preferred embodiments the location determining and tracking means comprises a global navigation satellite systems (GNSS) receiver, preferably a GPS receiver, and preferably a GPS chipset. Thus, in these particularly preferred embodiments, the method comprises receiving the position data from a GPS chipset of a device.

The position data relates to the position of the user at different times when travelling along a route. Thus the position data includes position data for the user at different times. Accordingly the position data may consist of a set of position data points, each data point representing the position of the user at a given time. In embodiments the position data may be obtained by the device at any given frequency to allow tracking of the device and hence user. In some embodiments the position data is obtained by the device at a rate of 0.5 Hz or greater, preferably at a rate of 1 Hz or greater, such as up to a rate of 20 Hz. In some embodiments the position data is received by the device at a rate of 1 Hz. Accordingly, in embodiments, the position data may relate to the position of a user at time intervals of less than or equal to 2 seconds, or less than or equal to 1 second, such as up to 0.05 s. In embodiments the received position data is associated with time information i.e. identifying the time to which the position data relates. The time information may be in the form of a timestamp.

The position data received and used in the smoothing operation of the present invention may be of any suitable form. Preferably the position data is GPS data. The data may be 2 dimensional position or 3 dimensional position data. Thus the position data preferably includes at least longitudinal and latitude data, and may include elevation data. Elevation data may be obtained in a similar manner to longitudinal and latitude position data from a GPS chip set of a device, or from a separate sensor, such as a barometric sensor of the device. The smoothing operation may be carried out using two or three dimensional position data to obtain a more accurate representation of the route travelled in two or three dimensions as desired. Thus, if the position data includes three dimensional position data, it is not necessary that the smoothing operation uses all three dimensions, or that the resulting route representation is in three dimensions.

The device from which the position data is received may be of any suitable type. In preferred embodiments the device is a mobile device that is arranged to be transported, carried or worn by a user. Preferably the mobile device does not include navigation functionality as found in vehicle PNDs. For example, preferably the device does not include map data stored within a memory of the device or processing means that can use map data to determine a route between a first location (or "origin") and a second location (or "destination") and provide suitable navigation (or guidance) instructions.

In some preferred embodiments, the mobile device is arranged to be carried by a user as he or she travels from one location to another. The mobile device can be arranged so as to be carried by the user, such as being attached to the user's arm or wrist, or simply by being placed in a pocket or other suitable receptacle (e.g. a specially designed holder or case). In other embodiments, the mobile device can be arranged so as to be transported by a user. For example, the mobile device can be attached to a vehicle being used by the user, e.g. a bicycle, canoe, kayak or other similar vehicle. The mobile device could also be attached to an object being pushed or pulled by a user, such as a child-carrying buggy. Such mobile devices are commonly referred to as portable personal training devices. Thus, in particularly preferred embodiments, the mobile device is a portable personal training device. In some preferred embodiments, the mobile device is a sports watch. Exemplary mobile devices from which data may be received in accordance with the present invention are described in the Applicant's co-pending application entitled "GPS Odometer", Taiwanese application no. 100100382, filed on 5 Jan. 2011 (subsequently filed as PCT application no. PCT/EP2011/054686, filed on 28 Mar. 2011); the entire contents of which are incorporated herein by reference. The present invention extends to a system comprising the device, and the method may further comprise the step of providing such a device.

The received position data may be raw data or may have undergone some initial processing. For example, the data may be filtered data e.g. which has undergone a Kalman filtering process. However, preferably, the data has not undergone any previous smoothing operation. Thus it is not necessary for the mobile device itself to be arranged to carry out a smoothing operation.

The data received relates to the travel of a user along a route. It will be appreciated the term "route" herein refers to any journey or movement made by a user, and does not imply that the user has followed a preplanned route. For example, the route may be a training run, and may not be of any particular form, or involve travel from an origin to a destination. The present invention is particularly applicable to the smoothing of position data obtained in relation to complex unplanned dynamical motion of a user.

In accordance with the invention, the smoothing operation is based on the received position data and additional data which comprises at least received user motion data. The user motion data may be or include data obtained in a similar manner to the position data. The method extends to the step of receiving the data. In some embodiments user motion data is received from the location determining and tracking means of the device that provides the position data, and preferably from a GPS chipset thereof. The user motion data may then be received in association with the position data. In preferred embodiments in which the user motion data is speed and/or direction data, such data is preferably obtained in this way.

In particularly preferred embodiments the user motion data is or includes speed and/or direction data. Direction data is data relating to the magnitude of the velocity of a user e.g. a velocity vector obtained from a GNSS receiver. The speed data is data relating to the magnitude of the velocity of a user e.g. a velocity vector obtained from a GNSS receiver. In preferred embodiments the speed data comprises speed over ground (SOG) data. In some preferred embodiments speed data is determined by a or the GNSS receiver of the mobile device receiving satellite signals indicating the speed or direction at which the receiver is moving over the ground. In embodiments the direction data is course over ground (COG) data. In some preferred embodiments direction data is determined by a or the GNSS receiver receiving satellite signals indicating the speed or direction at which the receiver is moving over the ground. In some preferred embodiments, whether or not it is in the form of SOG or COG data, the speed or direction data is Doppler speed or direction data.

The user motion data may additionally or alternatively include distance data. The distance data may, for example, be delta distance data obtained by consideration of the distance between individual position points or using "SOG" data to provide an integral of the speed with respect to time.

The user motion data may additionally or alternatively comprise data obtained from other sensors e.g. of the device. In some embodiments the user motion data may be or include accelerometer data. The data may be obtained from any type of accelerometer, and may be obtained from one or more accelerometers. The accelerometer data includes data relating to one or preferably both of a magnitude and direction of the acceleration. The accelerometer data may be in one, or more preferably at least two, and most preferably three axes. The or each accelerometer providing accelerometer data may be a single or multi-axis accelerometer, and, in some embodiments, may be a 3 axis accelerometer.

Accelerometer data may be obtained from an accelerometer of the mobile device from which the position data is obtained. The accelerometer may be an accelerometer provided in a main housing of the mobile device. However, it is envisaged that accelerometer data may alternatively or additionally be obtained from one or more "external" accelerometers operably connected to the mobile device and which are located outside a main housing of the device. For example, an accelerometer may be provided in a footpad sensor. In some embodiments accelerometer data is obtained from a pedometer of the device.

In some embodiments, the user motion data may be or include pedometer data. The pedometer may be of any type, such as a piezoelectric accelerometer. In some embodiments the user motion data includes data obtained from one or more sensors of a footpad associated with the mobile device. A footpad sensor, may, for example, comprise a sensor (accelerometer), e.g. that is positioned in the sole of a user's shoe and detects each time the shoe hits the ground. Thus such data may also be considered as accelerometer data. It will be appreciated that user motion data is not limited to pedometer data, and may include any type of human body dynamic motion data. Such data directly represents a measurement of the movement of a part of the user.

Alternatively or additionally user motion data may be obtained from one or more other sensors, such as gyroscopes, compasses, inertial sensors, etc. As with the accelerometer data, the further sensors may be located within a main housing of the mobile device or may be located outside such a housing being operably connected thereto.

It will be appreciated that user motion data may include any or all of the types of data mentioned above, or may consist of a single one of such data types. Thus, the user motion data may thus include one or more of speed, distance, direction, accelerometer or pedometer data. The user motion data is preferably received from the device from which the position data is received. The user motion data is preferably data obtained from one or more sensors of the device. The data may not necessarily be obtained from sensors within a main housing of the device, but may be obtained from other sensors operably connected thereto as discussed below. Thus the sensor or sensors may include internal and/or external sensors of the mobile device. While it is preferred that the additional, e.g. user motion, position data accuracy (as discussed below), etc, data is obtained from a sensor of the mobile device that provides the position data, it is envisaged that the sensor data could be provided from separate sensors or devices and transmitted in association with the position data. In preferred embodiments the user motion data includes user motion data for the user at a plurality of different times during travel along the route. In some embodiments user motion data is associated with each position data point in the received position data.

In some embodiments, in addition to receiving and using user motion data, the method may comprise using data relating to the accuracy of the received position data in the smoothing operation, and the method may comprise receiving such data. The data may be any information relating to the position data accuracy, and may include one or more of: satellite signal strength information (e.g. the "relative signal strength indicator" (RSSI)); and expected position error information (e.g. the "expected horizontal position error" (EHPE) and/or the "expected vertical position error" (EVPE)).

Data regarding the accuracy of position data may be obtained from a mobile device, e.g. from the GPS chipset or other sensor thereof. The device may receive such information from satellite signals, and/or may comprise suitable means for determining the accuracy of the position data. Thus in embodiments information regarding the accuracy of data is received in association with the relevant position data e.g. associated with received position data points.

Likewise, it is envisaged that where user motion data is received, data relating to the accuracy of the received user motion data may additionally be received, and may be used in the smoothing operation. In some embodiments information relating to the accuracy of speed, direction or accelerometer data is received and may be used. For example, this may be speed e.g. Doppler speed error, course error (e.g. Doppler course error), frequency of accelerometer, etc. The speed and/or direction accuracy information may include a "relative signal strength indicator" (RSSI) e.g. for the fourth satellite signal.

Indeed it is also contemplated, albeit in less preferred embodiments, that data relating to the accuracy of the received position data could be used on its own in the smoothing operation, i.e. without the user motion data.

Thus, in accordance with another aspect of the invention there is provided a method of generating a representation of the route, comprising the steps of:

receiving position data relating to the position of a user at a plurality of times when travelling along a route;

receiving data relating to the accuracy of the received position data; and performing a smoothing operation on the position data to generate a more accurate representation of the route travelled, wherein the smoothing operation comprises:

applying a spline algorithm to the received position data to obtain an estimated representation of the route in the form of a spline curve; and refining the estimated representation of the route using the data relating to the accuracy of the received position data.

In accordance with a further aspect of the invention there is provided a system, optionally a server, for generating a representation of the route, comprising:

means for receiving position data relating to the position of a user at a plurality of times when travelling along a route;

means for receiving data relating to the accuracy of the received position data; and means for performing a smoothing operation on the position data to generate a more accurate representation of the route travelled, wherein the smoothing operation comprises:

means for applying a spline algorithm to the received position data to obtain an estimated representation of the route in the form of a spline curve; and means for refining the estimated representation of the route using the data relating to the accuracy of the received position data.

It will be appreciated that these aspects of the invention may include any or all of the preferred and optional features described herein as appropriate.

As will be understood by those skilled in the art position data, e.g. GPS position data, may be subject to inherent non-predictable errors, which may be slowly time varying in nature, and can include: ionospheric effects, satellite ephemeris errors and satellite clock model errors. Even if a device with a GPS receiver in reality remains stationary for a period of time, position data output by the GPS receiver may show that the device has been in continual movement and thus has moved a certain, albeit possibly small, distance. This type of problem is exacerbated in the context of portable mobile training devices, as these are typically used by pedestrians who will move along routes often closer to buildings than vehicles, reducing satellite visibility and degrading horizontal dilution of precision (HDOP). Furthermore, users of such devices will typically have more complex dynamical movements than vehicles.

Thus, in accordance with the invention, a smoothing operation is performed on the received position data to generate a more accurate representation of the travelled route. The representation of the route travelled by the user obtained after performing the smoothing operation is more accurate than that provided by the received position data. It will be appreciated that the route referred to herein may refer to a route in two dimensions, involving at least latitude and longitude, or may be in three dimensions if elevation is also taken into account.

The smoothing operation comprises applying a spline algorithm to the received position data to obtain an estimate of the representation of the travelled route in the form of a spline curve, and refining the estimate using the additional data and optionally the received position data. The additional data comprises at least one of the received user motion data and data relating to the accuracy of the received position data, and optionally may include one or both of historical route data and digital map data. It will be appreciated that other data may additionally be used. In other words, the smoothing operation involves two stages: obtaining an initial estimate of the representation of the travelled route in the form of a spline curve; and refining that estimate. In some preferred embodiments, the additional data is not used to obtain the estimate of the representation of the travelled route (in the form of the spline curve). In preferred embodiments only the position data is used to obtain the estimate of the representation of the travelled route. Preferably the position data is additionally used in the refinement step.

The step of refining the estimate of the representation of the travelled route provides the more accurate representation of the travelled route, also referred to as "the smoothed route". The more accurate representation of the travelled route refers to the final result of whatever smoothing operation is performed, and which, in preferred embodiments, is output to a user. It will be appreciated that other processing of the data may also be carried out to provide the more accurate representation of the route, as well as smoothing. It will be appreciated that depending upon a given application, processing constraints, etc, different levels of smoothing may be performed to provide the more accurate representation. The refinement may or may not be carried out in one or more steps, and may involve carrying out successive refinement steps on the initial estimate of the route representation, and subsequent obtained refined estimates to provide the desired more accurate representation of the route.

The smoothing operation involves applying a spline algorithm to the received position data, and thus the smoothing algorithm comprises a spline smoothing algorithm, and most preferably a cubic spline smoothing algorithm. The application of the spline smoothing algorithm is a form of interpolation. The smoothing algorithm comprises a spline or preferably cubic spline curve fitting algorithm. While references herein will primarily be in relation to the preferred case in which the spline is a cubic spline, it will be appreciated that in broader terms, any reference to a "cubic spline", unless the context demands otherwise, may be replaced by the more general term "spline".

In accordance with the invention in which an estimate of the route representation is obtained and is then subjected to refinement, the spline, preferably cubic spline algorithm, is used in the first step of obtaining an estimate of the route representation. The spline curve obtained by applying a spline algorithm to the received position data represents the position of the user against time. In other words the spline curve is in the time and position domains. The estimate of the route representation is in the form of a spline curve. Preferably the spline algorithm is a cubic spline algorithm, and the resulting estimate of the route representation is in the form of a cubic spline curve. Preferably the spline algorithm operates only on the received position data, and not the additional data, to obtain the estimate of the route representation. It will be appreciated that the spline algorithm will operate on a set of data which includes position data and associated time data e.g. position data with timestamps.

In any embodiment involving a smoothing operation using a cubic spline smoothing algorithm, a curve is fitted to the received position data, wherein the curve is made up of a series of segments, the curve being such that the first and second derivatives of the curve are continuous. Thus, while the curve is a piecewise curve made up of segments connected together, as the first and second derivatives are continuous, the curve appears to be smooth and seamless. Each segment is defined by a cubic polynomial function. The segments of the cubic spline curve are connected at points known as "knots". Accordingly, in embodiments of the invention, the smoothing operation comprises applying a cubic spline smoothing algorithm to the position data to provide a cubic spline curve made up of a series of segments connected at knots. There will be fewer knots than points in the initial position data. The knots may or may not be evenly distributed in the time or position domains, and typically will not be evenly distributed. It will be appreciated that the curve defined by the cubic spline does not necessarily pass through each position data point, and in many cases will not do so.

The cubic spline algorithm may be of any type. The cubic spline algorithm may be a Bezier cubic spline algorithm. Each spline curve segment may then be in the form of a Bezier curve. However in preferred embodiments the cubic spline algorithm is a cubic B-spline algorithm. It will be appreciated that in embodiments in which a Bezier cubic spline algorithm is used, the shape of the resulting cubic spline curve will be defined by control points, typically four, some of which will not lie on the curve.

The method of the present invention further comprises the step of refining, and preferably optimizing, the estimate of the travelled route i.e. to provide the more accurate representation of the travelled route. This step is carried out using the additional data, and optionally the received position data. The step of refining the estimate of the travelled route is intended to cause the estimate to more closely approximate the actual route travelled. In preferred embodiments, the estimate of the travelled route is in the form of a cubic spline curve as mentioned above.

The refinement step is preferably carried out for the entire length of the estimate of the travelled route. The process may be carried out on a portion by portion basis. For example, the portions may be in the form of segments between knots, which may or may not be adjacent knots, of a route estimate in the form of a cubic spline curve (or alternatively control points if appropriate). The step of refining the estimate of the route representation e.g. spline curve comprises refining the shape and/or position of the estimate of the route representation i.e. spline curve. The step of refining the estimate may be carried out as an iterative process. In other words, the method may involve iterating through numerous possibilities for the shape and/or position of at least a portion of the route estimate to determine a shape and/or position deemed to provide the most accurate representation of the at least a portion of the travelled route based on predetermined criteria.

It will be appreciated that the route estimate will be refined or optionally optimized subject to certain constraints. For example, the route, e.g. curve, may be optimized for a certain criteria e.g. parameter or parameters to more closely approximate the route travelled. The optimization or refinement refers to optimization or refinement in respect of the relevant optimization or refinement step being carried out.

In some preferred embodiments the step of refining an estimate of the route representation in the form of a spline, e.g. cubic spline, curve comprises optimizing the position of one or more, and preferably each knot, associated with the spline curve using the additional data and preferably also the received position data. Movement of a knot of the spline curve will result in movement of at least a portion of the curve around the knot, and, unless otherwise constrained, may result in a movement of other knots of the curve on either side of the knot in question. In accordance with the invention, preferably the method further comprises constraining the effect of moving a knot such that the movement of the knot does not affect all other knots of the spline. In embodiments the effect of moving a knot is constrained such that movement of the knot affects only a limited given number of knots around the knot. In some embodiments, the effect of the movement of the knot may be limited to a single adjacent knot on either side of the knot in question. This may be done in any suitable manner, e.g. by specifying suitable parameters in the smoothing operation. It will be appreciated that optimizing the knot position may involve optimizing the position subject to certain constraints, e.g. wherein the knot may only be moved in a given radius, or between a limited number of possible positions. It may be that the optimal position of a knot does not involve moving the knot. In other embodiments, in which the spline is defined by a plurality of control points, the method may comprise carrying out any of the above steps alternatively or additionally in relation to a control point. Thus the term "knot" may be replaced by "control point" unless the context demands otherwise.

In preferred embodiments the step of refining the estimate of the route representation comprises causing the estimate of the representation of the travelled route to preferentially correspond more closely to a shape and/or position having a higher probability of representing the actual route travelled, and/or to preferentially correspond less closely to a shape and/or position having a lower probability of representing the actual route travelled. It will be appreciated that the step comprises causing at least a portion of the estimate of the representation to more or less closely correspond to the relevant shape and/or position, such that the overall estimate will more or less closely correspond thereto. However, preferably the refinement step is carried out for the entire length of the route estimate as described above. If certain portions of the estimate already correspond appropriately to a likely route, then no modification of those parts may be required.

It has been found that an active contour process provides a particularly effective way to refine the estimate of a route travelled where the estimate is in the form of a spline e.g. cubic spline curve. An active contour process provides a way of moving a curve or spline towards or away from a desirable or undesirable shape and/or position respectively according to certain predefined criteria. More specifically, in an active contour process, a configuration, i.e. shape and/or position, of a spline is determined which minimizes an energy associated with the spline. In other words, the active contour process involves using an energy minimizing spline. By assigning energy levels to regions around the spline and/or to parameters influenced by the shape and/or position of the spline appropriately, the spline can be caused to move toward a more desired shape and/or position and/or away from a less desirable shape and/or position.

In preferred embodiments the step of refining the estimate of the route comprises using an active contour process to refine the estimate of the route representation. In preferred embodiments, therefore, an active contour process is used to cause the estimate of the representation of the travelled route to preferentially correspond more closely to a shape and/or position having a higher probability of representing the actual route travelled, and/or to preferentially correspond less closely to a shape and/or position having a lower probability of representing the actual route travelled.

In the method of the present invention, the estimate of the route representation may be taken as the spline whose energy is to be reduced or minimized. The shape and/or position of the spline which reduces or minimizes the energy of the spline may then be determined using an active contour process in which relatively high energy is associated with shapes and/or positions of the spline which are less likely to correspond to the accurate route followed and/or a relatively low energy is associated with shapes and/or positions of the spline which are more likely to correspond to the accurate route followed.

It will be appreciated that the active contour process may be carried out in respect of the entire length of the curve, or at least a portion thereof. Preferably the process is carried out in respect of the entire length of the curve. The process may be carried out on a section by section basis in respect of portions along the length of the curve. Thus references to refining the estimate of the route representation using the active contour process or otherwise may refer to refining at least a portion of the estimate, and may include steps of refining multiple portions of the estimate in separate refinement processes.

In some preferred embodiments in which the position of one or more knots of a route estimate in the form of a spline e.g. cubic spline curve is optimized, the method comprises optimizing the position of the or each knot using an active contour process. A position of the or each knot which results in the lowest energy being associated with the route estimate or a portion thereof may be determined. It will be appreciated that where the effect of moving a knot is constrained to those knots neighboring the knot as discussed above, the effect of moving a knot will be limited to a portion of the estimate e.g. curve around the given knot. If the effect of moving each knot is constrained in this way, the curve may be optimized by optimizing the position of each knot along the length of the curve.

In some embodiments the step of optimizing the position of a knot may comprise defining a circle of a first radius around the knot, and moving the knot to a plurality of different positions around the circumference of the circle. The energy associated with the curve with the knot at each position is determined, and the knot moved to the lowest energy position found. This process may be repeated in a second pass, using a circle of a second smaller radius. The process may be repeated only for those knots moved in the first pass. The radii may be chosen to be of predefined values or in other embodiments may be chosen based on the total length of the route. It will be appreciated that this is merely one example of how a knot position may be optimized.

Of course, where appropriate any of the above steps may alternatively or additionally be carried out in relation to a control point rather than knot depending upon the form of the estimate of the route representation e.g. the form of cubic spline used.

In some embodiments the method may comprise reducing or minimizing a difference between the received user motion data, and preferably additionally the received position data, and corresponding data derivable from the estimate of the route e.g. cubic spline curve. In this way, the estimate may be caused to preferentially correspond more closely to a shape and/or position having a higher probability of representing the accurate route travelled, i.e. one which results in lesser differences between data derived from the estimate and actual measured data. The corresponding data is preferably determined from the estimate of the route representation, e.g. cubic spline curve. For example, position values in one or two dimensions may be determined from the curve for a given time. Speed and direction values may be derived by consideration of the magnitude and direction of the vector defined at a given point on the curve. Acceleration values may similarly be determined by consideration of the rate of change of speed from the curve by taking a second derivative.

As mentioned above, preferably the step of refining or optimizing the estimate of the route representation involves using an active contour process. Thus, in preferred embodiments the method comprises reducing or minimizing a difference between the received user motion data, and preferably additionally the received position data, and corresponding data derivable from the estimate of the route using an active contour process. Preferably the method comprises minimizing or reducing an energy associated with the route estimate in the active contour process, wherein the energy is a measure of a difference between the received user motion data, and preferably additionally the received position data, and corresponding data derivable from the route estimate.

Accordingly, in embodiments the method comprises, in the active contour process, associating a relatively high energy with positions and/or shapes of the estimate of the route representation resulting in greater differences between the received user motion data (and preferably also the received position data) and the corresponding values as determined from the estimate of the route representation, and/or associating a relatively low energy with positions and/or shapes of the estimate of the route representation resulting in lesser differences between the received user motion data (and preferably received position data) and the corresponding data as determined from the estimate of the route representation. Of course, the method may result in a relatively high or low energy being associated with the shapes/positions by positively assigning relatively high or low energy levels to certain positions/shapes and/or positively assigning relatively low or high levels to other positions/shapes or combinations thereof.

In this way, the estimate of the route representation, i.e. spline curve, may be pushed toward a shape and/or position which results in smaller differences between the received data and the corresponding data derivable from the representation or curve, such that the resulting refined estimate may be assumed to have a higher probability of corresponding to the actual route travelled. The step of minimizing may be subject to certain constraints as described above in relation to the term "optimizing". The energy is minimized for certain parameters e.g. types of data.

In preferred embodiments the energy associated with the estimated route includes respective components at least in respect of the user motion data, and preferably in respect of each type of user motion data, and optionally in respect of the position data. Each energy component is a measure of the difference between the received, i.e. measured, value for the data and the value obtainable from the route estimate e.g. curve. The energy may include a component in respect of each data or information type that is used in the smoothing step, and thus may also comprise components attributable to: the accuracy of the received position data; historical route data; and/or digital map data as discussed below where these data types are used. In this way the position of the curve may be simultaneously refined by reference to multiple different types of data. Each type of data may be seen as a parameter having an associated energy in the active contour process.

In preferred embodiments where the received user motion data include speed and direction data, there is preferably an energy component in respect of each of speed and direction. If the received data includes position data accuracy information, a component in respect thereof is additionally included. Likewise, in preferred embodiments a component in respect of a difference between received position data and the corresponding position data determined from the route estimate e.g. curve is included. In preferred embodiments the energy associated with the route estimate, e.g. cubic spline curve, comprises a sum of such energy components.

In these preferred embodiments using an active contour process, the energy associated with the route estimate or curve may be minimized on a knot by knot basis. As mentioned above, the effect of moving a knot may be limited e.g. to a portion of the curve between the previous and next adjacent knot. As mentioned above, the same process may alternatively be carried out in respect of a control point where appropriate for other types of spline curve, rather than a knot.

In accordance with some embodiments, the additional data upon which the smoothing operation is based, and which is used in the refinement step, additionally includes one or more of historical route data and digital map data. It will be appreciated that refinement using the historical route data or digital map data is carried out in addition to the refinement using the user motion data and/or position data accuracy data described above. Refinement may be carried in respect of the historical route data or digital map data at the same time as refinement using the other data, or in a separate step. Typically, as will be appreciated by those skilled in the art, the more types of data that are used in the refinement, e.g. active contour, process, the greater the level of refinement that may be obtained.

In embodiments in which the additional data further comprises historical route data, the step of refining the estimate of the route representation preferably further comprises causing the estimate of the representation of the travelled route to preferentially correspond more closely to a shape and/or position corresponding to at least a portion of a historical route. In other words, the route estimate is additionally caused to conform more closely to the historical route.

It will be appreciated that historical route data may provide information useful in obtaining a more accurate smoothed route. Historical routes may provide an indication as to the probability that the received position data is correct, and enables an estimate of the route representation to be refined. For example, a route estimate may suggest a route located close to a commonly used historical route. It may then be assumed that the actual route taken corresponds to the historical route. Thus the route estimate may be caused to correspond more closely to a shape and/or configuration corresponding to a historical route as it can be assumed that there is a higher probability of this corresponding to the actual path taken. Rather than simply trying to match position data to the historical route data as may be more typical e.g. when considering vehicle route information, in accordance with the invention, the historical route data is used in the smoothing operation. The historical route data may be used to "pull" the estimate of the route representation closer to a commonly used historical route. Conversely the historical route data may be used to push the route estimate away from regions which do not correspond to an historical path i.e. where there is a lower probability that the region corresponds to the actual path taken. In preferred embodiments this is achieved using an active contour process. In these embodiments the active contour process is one in which an energy associated with the route estimate is influenced by the position of a portion of an historical route relative to at least a part of the route estimate. The energy may be influenced by the presence of a portion of a historical route in a given proximity to the estimate or may take into account relative distance from such features. It will be appreciated that in some cases there may be a historical trace in the vicinity of at only a part of the route estimate. In such cases historical route data may be used to refine only a part of the route estimate.

In preferred embodiments the method comprises storing historical route data for use in the smoothing operation. The historical route data is preferably derived from position data obtained from devices of any of the types discussed in relation to providing position data for use in the smoothing operation of the present invention. Thus the historical route data may be derived from position data received from mobile devices having location determining and tracking means, and most preferably from portable training devices. The historical route data may be stored by a central server e.g. that carries out the smoothing operation or otherwise in a manner accessible to such a server.

The historical route data is preferably smoothed route data. Thus the information may be information obtained as a result of performing the methods described herein. The historical route data is preferably representative of common paths taken. This is rather than relating to an individual path. In preferred embodiments the historical route data for a given historical route is based on multiple position traces. In other words, the route data has been subjected to an "averaging process". The historical route data may be obtained by bundling together multiple individual historical position data traces e.g. GPS traces as known in the art.

It is believed that refinement of a route estimate in the form of a spline curve obtained by applying a spline algorithm to received position data using historical route data may be advantageous in its own right.

Thus, in accordance with another aspect of the invention there is provided a method of generating a representation of the route, comprising the steps of:

receiving position data relating to the position of a user at a plurality of times when travelling along a route; and performing a smoothing operation on the position data to generate a more accurate representation of the route travelled, wherein the smoothing operation comprises:

applying a spline algorithm to the received position data to obtain an estimated representation of the route in the form of a spline curve; and refining the estimated representation of the route using stored historical route data indicative of previous routes travelled by the user and/or other users.

In accordance with a further aspect of the invention there is provided a system, optionally a server, for generating a representation of the route, comprising:

means for receiving position data relating to the position of a user at a plurality of times when travelling along a route; and means for performing a smoothing operation on the position data to generate a more accurate representation of the route travelled, wherein the means for performing a smoothing operation comprises:

means for applying a spline algorithm to the received position data to obtain an estimated representation of the route in the form of a spline curve; and means for refining the estimated representation of the route using stored historical route data indicative of previous routes travelled by the user and/or other users.

The present invention in any of these further aspects may include any or all of the preferred and optional features described herein as appropriate.

Embodiments in which the smoothing operation is carried out based additionally on digital map data, wherein such data is used in the refinement of the estimate of the route representation will now be described. In these embodiments the method may comprise a step of refining the estimate of the route representation comprising causing the estimate of the representation of the travelled route to preferentially correspond more closely to a shape and/or position having a higher probability of representing the actual route travelled, and/or to preferentially correspond less closely to a shape and/or position having a lower probability of representing the actual route travelled using the digital map data, wherein the shape and/or position having a higher probability of representing the actual route travelled, and/or the shape and/or position having a lower probability of representing the actual route travelled, is determined, at least in part, on the basis of geographic features represented by the digital map data. The digital map data may be used to refine only a part or parts of the route estimate.

It will be appreciated that it can be assumed that it is not possible, or at least unlikely, that a route taken by a user coincides with certain features represented by a digital map. Such areas include areas which are not navigable by a pedestrian. For example, a user is unlikely to have passed through an area of water or through the footprint of a building. Conversely, a pedestrian is likely to have passed through a park or similar type of open space. In embodiments, the digital map data may be used to push the estimate of the route toward or away from features represented by the map which have a relatively higher or lower probability of fanning part of the travelled route. Preferably this is carried out in an active contour process. Preferably an energy associated with the route estimate is influenced by the position of certain geographical features represented by a digital map relative to the position of at least a part of the route estimate. The energy may be influenced by the presence of given features in a given proximity to the at least a part of the estimate or may take into account relative distance from such features. In preferred embodiments in which digital map data is used to refine the estimated route, the method comprises, using an active contour process, minimizing or reducing an energy associated with at least a part of the route estimate, wherein the energy is influenced by the position of certain geographical features represented by a digital map relative to at least a part of the route estimate.

By associating relatively high energy with positions or features represented by a digital map that are unlikely to form part of the travelled route, or conversely by associating relatively low energy to positions or features represented by the map that are more likely to form part of a travelled route, when a route estimate is refined or optimized in an active contour process so as to minimize the energy associated with the route estimate, the route estimate can be moved away from the less likely areas and/or toward the more likely areas. Of course, it is always conceivable that a user may have e.g. passed through a building, as there may be an underpass. By assigning such areas high energy rather than forbidding the route to go through them completely, the present invention provides a more flexible method, which may provide an enhanced route approximation. In general the technique will simply shift the route away from e.g. buildings providing a more accurate representation e.g. where GPS inaccuracies suggested the user passed through a building. Conversely areas of a digital map which may be more likely routes for e.g. pedestrians, such as parks, could be assigned a relatively low energy to push the route toward them.

In embodiments the method comprises minimizing or reducing an energy associated with the route estimate in an active contour process, wherein relatively low energy is associated with positions and/or shapes of at least a part of the route estimate likely to correspond to at least a part of the travelled route on the basis of digital map data and/or wherein relatively high energy is associated with positions and/or shapes of at least a part of the route estimate unlikely to correspond to at least a part of the travelled route on the basis of digital map data e.g. on the basis of geographical features represented by the digital map data. The terms "likely" or "unlikely" refer to positions which have a relatively greater or lesser probability of forming part of a travelled route.

Preferably the method comprises associating an energy with geographical features represented by a digital map, wherein relatively high energy is associated with features which are unlikely to form part of the travelled route based on the digital map data, and/or a relatively low energy is associated with features which are likely to form part of a travelled route based on the digital map data. The information may then be used in the step of minimizing or reducing the energy associated with the route to refine the route estimate using the digital map data. The digital map data may provide the energy information for use in comparing energy associated with different potential shapes and/or positions of the route estimate.

It will be appreciated that the energy information to be associated with features represented by the digital map may be determined on a generic basis rather than in relation to a particular route. Thus certain geographic features may be assumed to be unlikely or likely to form part of any route to be determined. In embodiments relatively high or low energy respectively may be associated with such areas respectively. In accordance with embodiments in which digital map data is used, preferably the geographical features unlikely to form part of the actual route travelled or with which relatively high energy is associated, are pedestrian non-navigable areas. References to the geographical features unlikely to form part of the actual route travelled herein may be replaced by the term "pedestrian non-navigable areas". Examples of such areas include bodies of water and building footprints. Examples of features which may be deemed likely to form part of the route, or with which relatively low energy may be associated, include parks. The relevant features may be determined according to certain criteria, e.g. depending upon the type of route, user preferences, etc.

In preferred embodiments using digital map data, the method comprises storing digital map data for use in the refinement process, preferably in association with energy information. The data may be stored by a server which carries out the smoothing operation, or otherwise so as to be accessible thereto.

It is believed that refinement of a route estimate in the form of a spline curve obtained by applying a spline algorithm to received position data using digital map data may be advantageous in its own right.

Thus, in accordance with another aspect of the invention there is provided a method of generating a representation of a travelled route, comprising the steps of:

receiving position data relating to the position of a user at a plurality of times when travelling along a route; and performing a smoothing operation on the position data to generate a more accurate representation of the route travelled, wherein the smoothing operation comprises:

applying a spline algorithm to the received position data to obtain an estimated representation of the route in the form of a spline curve; and refining the estimated representation of the route using stored digital map data.

In accordance with a further aspect of the invention there is provided a system, optionally a server, for generating a representation of a travelled route, comprising:

means for receiving position data relating to the position of a user at a plurality of times when travelling along a route; and means for performing a smoothing operation on the position data to generate a more accurate representation of the route travelled, wherein the means for performing a smoothing operation comprises:

means for applying a spline algorithm to the received position data to obtain an estimated representation of the route in the form of a spline curve; and means for refining the estimated representation of the route using stored digital map data.

The present invention in any of these further aspects may include any or all of the preferred and optional features described herein as appropriate. For example, the digital map data can comprise areas which are not navigable (or at least not typically navigable) by a pedestrian, such as building footprints, bodies of water or the like.

In embodiments in which the step of refining, and optionally optimizing, the estimate of the route travelled involves the use of multiple types of data, e.g. user motion data, data relating to the accuracy of the received position data, historical route data and/or digital map data, refinement may be carried out with respect to multiple data types in a single step or multiple steps. It has been found that the active contour processes used in preferred embodiments provide the ability to simultaneously refine the route estimate with respect to multiple data types, by simply adding in additional components to an equation representing the energy associated with the shape and/ or position of the curve. The energy of the curve may be minimized with respect to any number of desired data types. Of course, it could be envisaged that refinement could be carried out for different data types in a sequence of steps rather than in a single step. Thus an active contour process may comprise one or more steps. It will be appreciated that references to "an active contour process" herein with respect to refinement using additional data in the form of position accuracy data, historical route data or digital map data, may refer to "the" active contour process, i.e. such that refinement with respect to all data types are carried out in the same active contour process, which may include one or more steps. Likewise, steps of causing the estimate to conform more or less closely to a given shape and/or position as described herein using additional data comprising position accuracy data, historical route data or digital map data may be part of the same process using the user motion and/or position data accuracy data. The step of causing the estimate to conform more or less closely to a given shape is then carried out using the different data types in accordance with any of the embodiments described. Of course, it could be envisaged that multiple active contour processes could be carried out at different times and/or places.

It will be appreciated that the number of data types with respect to which refinement is carried out, may be selected as desired, depending upon factors such as processing power available, acceptable processing times, etc. In practice, it has been found that refinement with respect to the user motion data and/or data relating to the accuracy of the received position data may be carried out relatively quickly and may result in significant refinement of a route estimate. Additional refinement with respect to historical route data and/or digital map data, whilst preferred, may not always be possible depending on whether relevant data exists in respect of the region in question.

In accordance with the invention in any of its aspects or embodiments, preferably the steps of receiving the data (e.g. position data and any other data) and performing the smoothing operation are carried out by a central server. The system of the present invention may comprise a central server arranged to perform any or all of the steps referred to herein. The received data may be received directly or indirectly from a device. At least the position data is data generated by the device e.g. by location determining and tracking means of a device such as a GPS chipset thereof. The data may be transferred from the device automatically to the central server or in response to user intervention. In some embodiments the received data is data that has been stored by a device for subsequent transfer to the central server. For example, the data may be stored by a data storage means of the device which may be integral with the device or removable therefrom. The data may be transferred from a device to the central server in any manner. For example, in some embodiments, a mobile device may be provided with wireless communication means to allow data stored on a data storage means of the device to be transferred over the air e.g. to a computer or other device that has access to the Internet. In other embodiments, the mobile device may comprise a data connector, such as a USB connector, that is connected to the data storage means. This may enable data to be transferred from the data storage means to a computer or other suitable device by inserting the connector into a suitable port. In other embodiments, the user may remove a data storage means of the device and connect it to a computer or other device that has access to the Internet.

In embodiments, the server may be arranged to store historical route data and/or digital map data for use in the smoothing operation. The data may be associated with energy information in embodiments in which refinement of a route is carried out using energy information.

The result of the methods of the present invention after whichever smoothing operations are carried out is a more accurate e.g. smoothed representation of the travelled route. In accordance with the invention in any of its embodiments the method preferably further comprises providing the more accurate representation of the route ("the smoothed route") to a web page. The more accurate representation of the route may then be displayed to a user via the web page as described below. Thus, in embodiments in which the smoothing is carried out by a central server, the central server is arranged to provide the more accurate representation of the route to a web page e.g. for display to a user. It will be appreciated that the central server may directly or indirectly provide the more accurate representation of the route to the web page. For example, the server may provide smoothed route data to another server for provision to the web page or may directly provide the smoothed route data to the web page.

It will be appreciated that the smoothing technique of the present invention may be carried out in respect of data that has been uploaded from a device for submission to a web page. The data may, when transferred from the device to the web page, be automatically routed via the central server for smoothing. Thus, in practice, a user may not directly upload or otherwise transfer data to the central server for smoothing, but rather transfer the data to a web page, with the data smoothing occurring before the data is supplied to the web page.

In some preferred embodiments the smoothing operation of the present invention is carried out on data uploaded to a webpage before the data is displayed to a user. Thus the data is indirectly uploaded to a web page, passing via a central server for the smoothing operation to be performed en route. Thus a user may not intentionally upload the data to the central server for the smoothing operation. In embodiments the method may comprise automatically directing data uploaded from a device to a web page to a central server for performing the smoothing operation of the present invention before the data is displayed on the web page. The more accurate representation of the route may then be caused to be displayed on the web page after the smoothing operation.

Preferably the method of the present invention in any of its embodiments further comprises causing the more accurate representation of the route to be displayed to a user. For example, where the route is a route followed by the user on a training run or cycle, they may then view the route taken at a subsequent time, together with other data relating to the training e.g. speeds at particular times during the route, distance covered etc. It will be appreciated that the user to whom the route is displayed may be the same user who took the route or another user. Preferably the step of displaying the more accurate representation of the route comprises causing the more accurate representation of the route to be displayed on a digital map. In preferred embodiments the method further comprises determining the more accurate representation of the route travelled with respect to a digital map, and the system comprises means for carrying out such a step. As mentioned previously, the smoothed route may be a route determined in two dimensions or three dimensions. Thus the position data that is smoothed may be longitudinal and latitudinal position information and optionally elevation information. The more accurate representation of the route may be a digital smoothed route model in two or three dimensions.

In preferred embodiments the method comprises displaying the more accurate representation of the route to a user on a digital map, preferably wherein the displayed digital map includes elevation information along the route. The elevation information may form part of the more accurate representation of the route in embodiments in which the smoothed route was determined using three dimensional position data. In other embodiments, the elevation information may be determined using received elevation position data, i.e. data which has not been subjected to a smoothing operation. In some preferred embodiments a combination of smoothed and unsmoothed elevation data is used to provide the displayed elevation information along the route.

The method may comprise causing the more accurate representation of the route to be displayed to a user via any suitable display means. The display means will typically be local display means e.g. of a user terminal. The method may comprise displaying the route to the user via a computer or other device that has access to the Internet. In some preferred embodiments the more accurate representation of the route is displayed via a web page accessible by the user. For example the route may be displayed via a mobile communications device e.g. a PDA, laptop computer, or mobile phone of the user. It will be appreciated that in these preferred embodiments, the position data is subjected to the smoothing operation prior to being displayed on a web page.

In accordance with the method in any of its embodiments the method preferably further comprises storing the more accurate representation of the route. The stored route may then be used in the determination of historical route data for use in a smoothing operation in accordance with certain embodiments of the present invention in relation to subsequent received position data.

The present invention extends to a computer program product comprising computer readable instructions executable to perform a method according to any of the aspects or embodiments of the invention, or to cause a system e.g. central server to perform such methods.

It will be appreciated that in any of the embodiments described, the active contour process could, instead, be used to maximize or increase an energy associated with the route estimate. In this case low energy values would be assigned with less desirable positions or shapes of the curve and high energy values with more desirable positions/shapes, in the reverse of the arrangement discussed above. It will be appreciated that references to "relatively high" or "relatively low" energy herein refer to the energy of e.g. associated with a digital map or shape and/or position of a curve in comparison to surrounding regions or positions/shapes. For example, a relatively low energy may be associated with the position of a historical route compared to surrounding regions. The surrounding regions may or may not be associated with any specific energy i.e. they may define an unchanged or base energy. Similarly a relatively low energy associated with a map feature unlikely to form part of a route would in the same way have a relatively low energy compared to surrounding regions in order to draw the route estimate toward it in an energy minimizing process. Thus the energy may be relative low or high compared to a surrounding base level, which may be unmodified, or, to other areas which have been assigned a energy level.

In embodiments in which an active contour process is used taking into account various types of data, e.g. historical data and digital map data, separate energy minimizing or reducing steps may be carried out for each type of data, or, more preferably the data could form components of an overall energy equation as appropriate.

Advantages of these embodiments are set out hereafter, and further details and features of each of these embodiments are defined in the accompanying dependent claims and elsewhere in the following detailed description.

BRIEF DESCRIPTION OF THE DRAWINGS

Various aspects of the teachings of the present invention, and arrangements embodying those teachings, will hereafter be described by way of illustrative example with reference to the accompanying drawings, in which:

FIG. 3A illustrates the hinged cover at the end of the watch strap lifted up to reveal a USB connector;

Like reference numerals are used for the like features throughout the drawings.

DETAILED DESCRIPTION OF THE PREFERRED EMBODIMENTS

Preferred embodiments of the present invention will now be described with particular reference to data received from a portable personal training device, such as a sports watch, having access to Global Positioning System (GPS) data. Sports watches after the type described are often worn by athletes to help them during their runs or workouts, e.g. by monitoring the speed and distance of the user and providing this information to the user. It will be appreciated, however, that the device could be arranged to be carried by a user or connected or "docked" in a known manner to a vehicle such as a bicycle, kayak, or the like. Devices of this type are described in more detail in the Applicant's co-pending application entitled "GPS Odometer", Taiwanese application no. 100100382, filed on 5 Jan. 2011 (subsequently filed as PCT application no. PCT/EP2011/054686, filed on 28 Mar. 2011).

Figure 1:
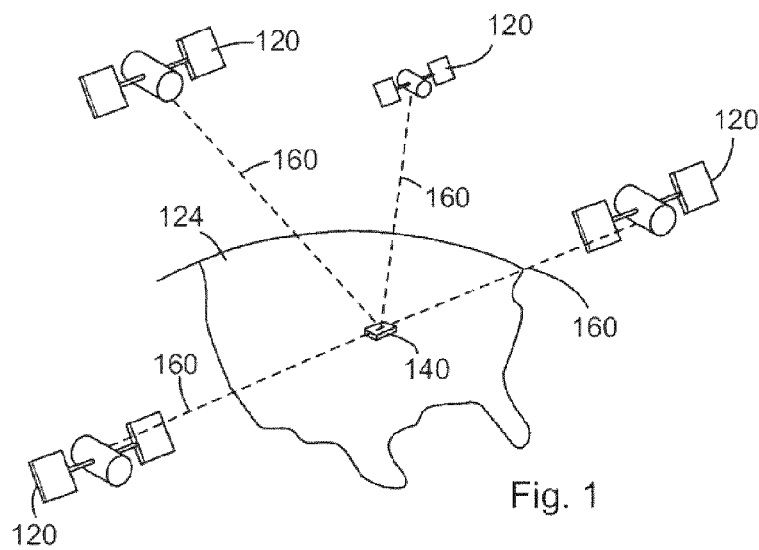
FIG. 1 is a schematic illustration of a Global Positioning System (GPS)

FIG. 1 illustrates an example view of Global Positioning System (GPS), usable by such devices. Such systems are known and are used for a variety of purposes. In general, GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal will allow the receiving device to calculate its three dimensional position by the same geometrical calculation in a known manner. The position and velocity data can be updated in real time on a continuous basis by an unlimited number of users.

As shown in FIG. 1, the GPS system is denoted generally by reference numeral 100. A plurality of satellites 120 are in orbit about the earth 124. The orbit of each satellite 120 is not necessarily synchronous with the orbits of other satellites 120 and, in fact, is likely asynchronous. A GPS receiver 140 is shown receiving spread spectrum GPS satellite signals 160 from the various satellites 120.

The spread spectrum signals 160, continuously transmitted from each satellite 120, utilize a highly accurate frequency standard accomplished with an extremely accurate atomic clock. Each satellite 120, as part of its data signal transmission 160, transmits a data stream indicative of that particular satellite 120. It is appreciated by those skilled in the relevant art that the GPS receiver device 140 generally acquires spread spectrum GPS satellite signals 160 from at least three satellites 120 for the GPS receiver device 140 to calculate its two-dimensional position by triangulation. Acquisition of an additional signal, resulting in signals 160 from a total of four satellites 120, permits the GPS receiver device 140 to calculate its three-dimensional position in a known manner.

Figure 2:
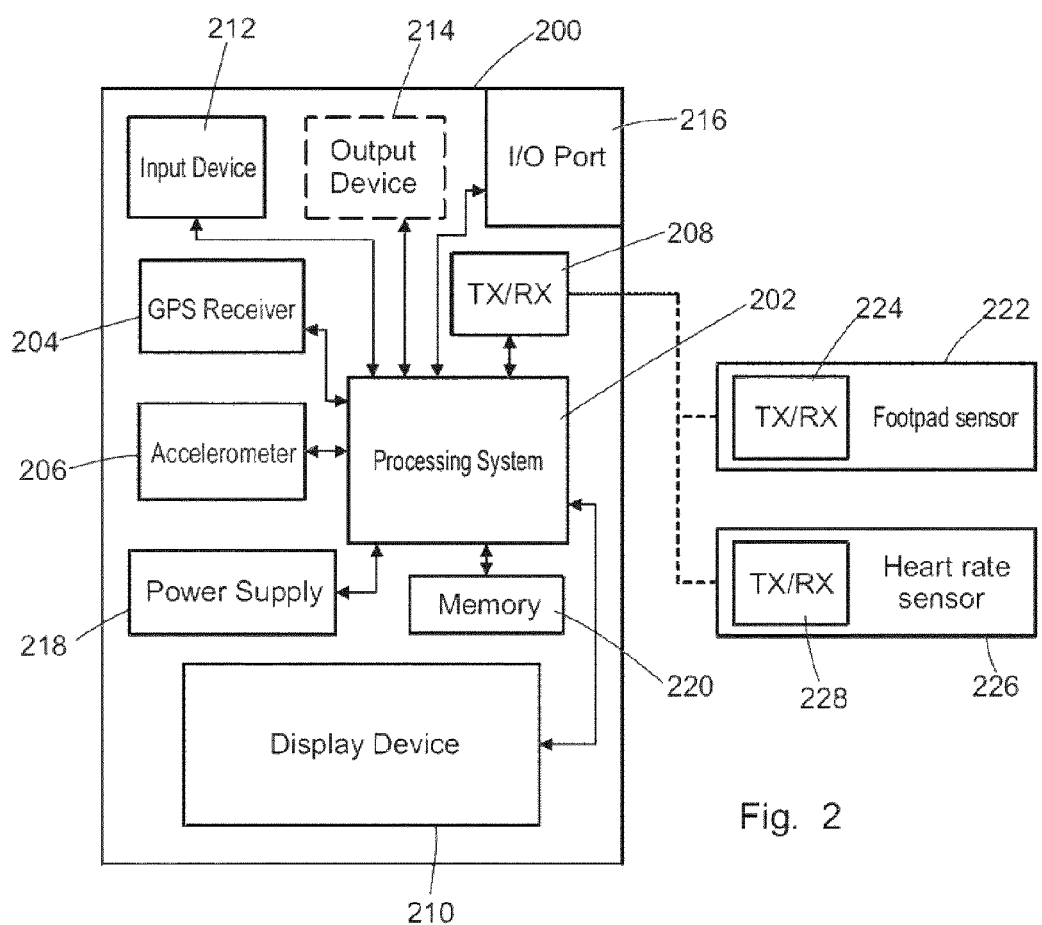
FIG. 2 is a schematic illustration of electronic components arranged to provide a portable personal training device.

FIG. 2 is an illustrative representation of electronic components of a personal portable training device 200 according to a preferred embodiment of the present invention, in block component format. It should be noted that the block diagram of the device 200 is not inclusive of all components of the navigation device, but is only representative of many example components.

Figure 3:
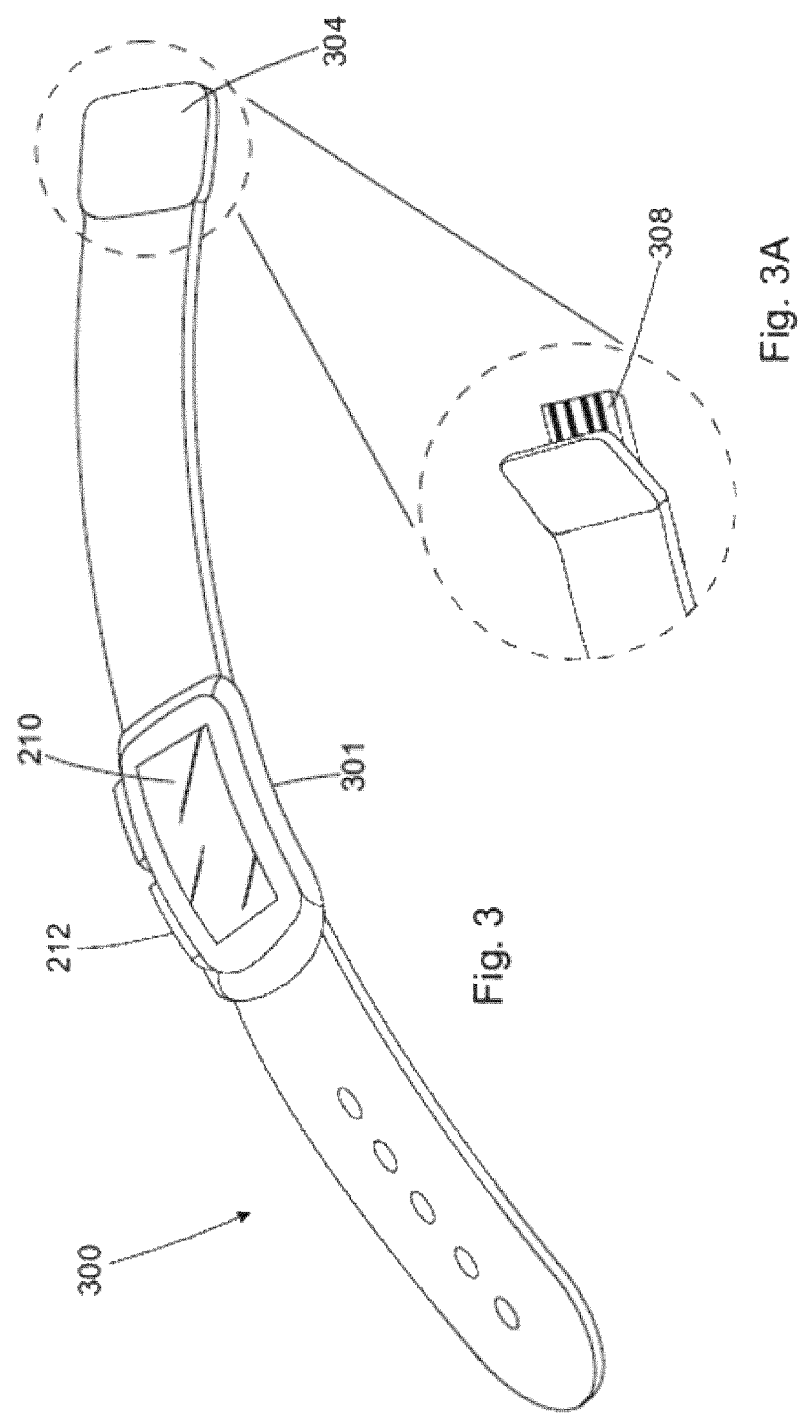
FIG. 3 shows an embodiment of the device of FIG. 2, wherein the device is in the form of a sports watch.

The device 200 includes a processor 202 connected to an input device 212 and a display screen 210, such as an LCD display. The input device 212 can include one or more buttons or switches (e.g. as shown in FIG. 3). The device 200 can further include an output device arranged to provide audible information to a user, such as alerts that a certain speed has been reached or a certain distance has been travelled.

FIG. 2 further illustrates an operative connection between the processor 202 and a GPS antenna/receiver 204. Although the antenna and receiver are combined schematically for illustration, the antenna and receiver may be separately located components. The antenna may be a GPS patch antenna or helical antenna for example.

The device 200 further includes an accelerometer 206, which can be a 3-axis accelerometer arranged to detect accelerations of the user in x, y and z directions. The accelerometer may act as a pedometer for use when/if there is a loss of GPS reception and may also act as a means for determining a motion state of a wearer at a particular moment in time as described in the Applicant's co-pending PCT application no PCT/EP2011/054686, filed on 28 Mar. 2011 entitled "GPS Odometer". Although the accelerometer is shown to be located within the device, the accelerometer may also be a external sensor worn or carried by the user, and which transmits data to the device 200 via the transmitter/receiver 208.

The device may also receive data from other sensors, such as a footpad sensor 222 or a heart rate sensor 226. The footpad sensor may, for example, be a piezoelectric accelerometer that is located in or on the sole of the user's shoe. Each external sensor is provided with a transmitter and receiver, 224 and 228 respectively, which can be used to send or receiver data to the device 200 via the transmitter/receiver 208.

The processor 202 is operatively coupled to a memory 220. The memory resource 220 may comprise, for example, a volatile memory, such as a Random Access Memory (RAM), and/or a non-volatile memory, for example a digital memory, such as a flash memory. The memory resource 220 may be removable. As discussed in more detail below, the memory resource 220 is also operatively coupled to the GPS receiver 204, the accelerometer 206 and the transmitter/receiver 208 for storing data obtained from these sensors and devices.

Further, it will be understood by one of ordinary skill in the art that the electronic components shown in FIG. 2 are powered by a power source 218 in a conventional manner. The power source 218 may be a rechargeable battery.

The device 200 further includes an input/output (I/O) device 216, such as a USB connector. The I/O device 216 is operatively coupled to the processor, and also at least to the memory 220 and power supply 218. The I/O device 216 is used, for example, to: update firmware of processor 220, sensors, etc; transfer data stored on the memory 220 to an external computing resource, such as a personal computer or a remote server; and recharge the power supply 218 of the device 200. Data could, in other embodiments, also be sent or received by the device 200 over the air using any suitable mobile telecommunication means.

As will be understood by one of ordinary skill in the art, different configurations of the components shown in FIG. 2 are considered to be within the scope of the present application. For example, the components shown in FIG. 2 may be in communication with one another via wired and/or wireless connections and the like.

FIG. 3 illustrates a preferred embodiment of the device 200, wherein the device 200 is provided in the form of a watch 300. The watch 300 has a housing 301 in which is contained the various electronic components on the device as discussed above. Two buttons 212 are provided on the side of the housing 301 to allow the user to input data to the device, e.g. to navigation a menu structure shown on the display 210. Any number of buttons, or other types of input means, can alternatively be used as desired.

The watch 300 has a strap 302 for securing the device to a user's wrist. As can be seen the end of the strap 302 has a hinged cover 304 that can be lifted up, e.g. as shown in FIG. 3A, to reveal a USB connector 308. The connector can be inserted into any suitable USB port for power and/or data transfer as described above.

The GPS receiver 204 of the device receives satellite signals, when such signals can be received, indicating numerous pieces of information associated with the wearer. For example, the current location of the wearer (longitude and latitude), velocity vector of the wearer, the current elevation of the wearer, etc, together with other data indicative of the "quality" of the satellite signals, such as the estimated horizontal and vertical position error. This information will typically be received at a rate normally associated with vehicle applications, such as 1 Hz. The signals are passed to the processor 202 through an interface. The signal may be pre-processed, e.g. to convert the signals into useable data as known in the art.

Similarly, the accelerometer 206 is simultaneously obtaining data concerning the dynamical movement of the user and/or device. This data will typically comprise a measure of the acceleration along each of three perpendicular axes, e.g. x, y and z axes.

The elevation of the user is again provided by the GPS receiver 204, when there are a sufficient number of satellites.

The pedometer can be an accelerometer, such as the accelerometer 206, or a footpad sensor, such as 222. If the device has access to both such devices, then typically the footpad sensor 222 is used as the pedometer, since it will typically be more accurate than the accelerometer 206.

As will be appreciated, the device 200 is designed to be worn by a runner or other athlete as they undertake a run or other similar type of workout. The various sensors within the device 200, such as the GPS receiver 204 and the accelerometer 206, collect data associated with this run, such as the distance travelled, current speed, etc, and display this data to the wearer using the display screen 210.

Figure 4:
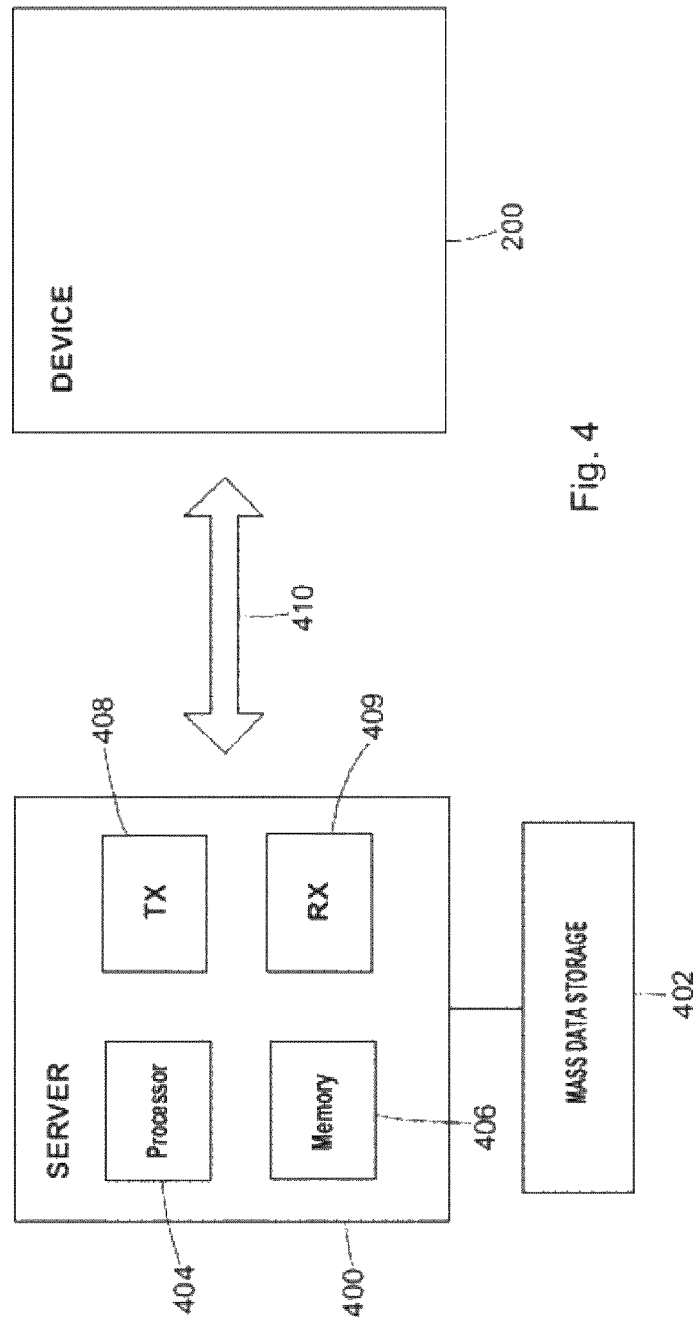
FIG. 4 is a schematic illustration of the manner in which a navigation device may receive information over a wireless communication channel.

In FIG. 4 the device 200 is depicted as being in communication with a server 400 via a generic communications channel 410 that can be implemented by any number of different arrangements. The server 400 and device 200 can communicate when a connection is established between the server 400 and the navigation device 200 (noting that such a connection can be a data connection via mobile device, a direct connection via personal computer via the internet, etc.).

The server 400 includes, in addition to other components which may not be illustrated, a processor 404 operatively connected to a memory 406 and further operatively connected, via a wired or wireless connection, to a mass data storage device 402. The processor 404 is further operatively connected to transmitter 408 and receiver 409, to transmit and send information to and from device 200 via communications channel 410. The signals sent and received may include data, communication, and/or other propagated signals. The functions of transmitter 408 and receiver 409 may be combined into a signal transceiver.

The communication channel 410 is not limited to a particular communication technology. Additionally, the communication channel 410 is not limited to a single communication technology; that is, the channel 410 may include several communication links that use a variety of technology. For example, the communication channel 410 can be adapted to provide a path for electrical, optical, and/or electromagnetic communications, etc. As such, the communication channel 410 includes, but is not limited to, one or a combination of the following: electric circuits, electrical conductors such as wires and coaxial cables, fibre optic cables, converters, radio-frequency (RF) waves, the atmosphere, empty space, etc. Furthermore, the communication channel 410 can include intermediate devices such as routers, repeaters, buffers, transmitters, and receivers, for example.

In one illustrative arrangement, the communication channel 410 includes telephone and computer networks. Furthermore, the communication channel 410 may be capable of accommodating wireless communication such as radio frequency, microwave frequency, infrared communication, etc. Additionally, the communication channel 410 can accommodate satellite communication.

The server 400 may be a remote server accessible by the device 200 via a wireless channel. The server 400 may include a network server located on a local area network (LAN), wide area network (WAN), virtual private network (VPN), etc.

The server 400 may include a personal computer such as a desktop or laptop computer, and the communication channel 410 may be a cable connected between the personal computer and the device 200. Alternatively, a personal computer may be connected between the device 200 and the server 400 to establish an internet connection between the server 400 and the device 200. Alternatively, a mobile telephone or other handheld device may establish a wireless connection to the internet, for connecting the device 200 to the server 400 via the internet.

The server 400 is further connected to (or includes) a mass storage device 402. The mass storage device 402 contains a store of at least digital map information. In embodiments of the invention, this digital map information can be used, together with data from the device, such as time-stamped location data obtained from the GPS receiver 204 and data indicative of motion of the wearer obtained from the accelerometer 206, footpad sensor 222, etc, to determine a route travelled by the wearer of the device 200, which can then be viewed by the wearer.

The present invention is directed to methods of smoothing position data received from a device such as the personal portable training device 200 illustrated above. The data may or may not have been subjected to some pre-processing e.g. Kalman filtering by the device 200.

The device is connected to a server 400 by a user in any of the manners described above in order to upload data relating to, for example, a training run. It will be appreciated that data relating to one or more training runs may be uploaded at any given time, but for ease of explanation, the description of the embodiments of the present invention below will be made with respect to a given training run. When the device is suitably connected to the server, time stamped GPS position data obtained from the GPS receiver 204 is uploaded to the server. In addition to the position data, other data, which may be referred to as "user motion data" relating to the run, is uploaded in association with the position data.

Such user motion data includes data from one or both of the accelerometer 206 and footpad sensor 222, as well as other data from the GPS receiver 204. Thus, for example, the data includes accelerometer data (ACC). The data includes speed over ground (SOG) which is obtained from the GPS receiver 204, course over ground (COG) which is also obtained from the GPS receiver 204. COG data effectively provides direction data for the user's motion. The SOG and COG data may be Doppler speed and direction data respectively. The data also includes pedometer data (EMP) which may be obtained from the accelerometer 206 or more preferably footpad sensor 22. In addition, other human body dynamic data (HUM) relating to the movement of the user may be uploaded. Such data may be similar to the pedometer data, and may be obtained from sensor data directly measuring the movement of parts of the body of the user.

As well as the user motion data, data relating to the accuracy of the uploaded position data is also uploaded to the server. Such data may be obtained from the GPS receiver 204, and can include satellite signal strength (RSSI) and estimated horizontal position error (EHPE) data.

It will be appreciated that the uploaded GPS position data may be raw data, or data which has undergone some e.g. Kalman filtering, or other pre-processing by the device prior to uploading. In order to obtain a useful approximation of a route travelled on the training run from the data, it is necessary to carry out smoothing of the data. To this end, the processor 404 of the server 400 is arranged to carry out a smoothing operation to obtain a more accurate or smoothed representation of the route travelled which may then be displayed to a user. The methods of the present invention may be implemented by the server when data is received from a device before the route is displayed to a user via a webpage. Thus when a user uploads the data to a webpage for viewing, the data is first subjected to the smoothing operation.

Figure 5:
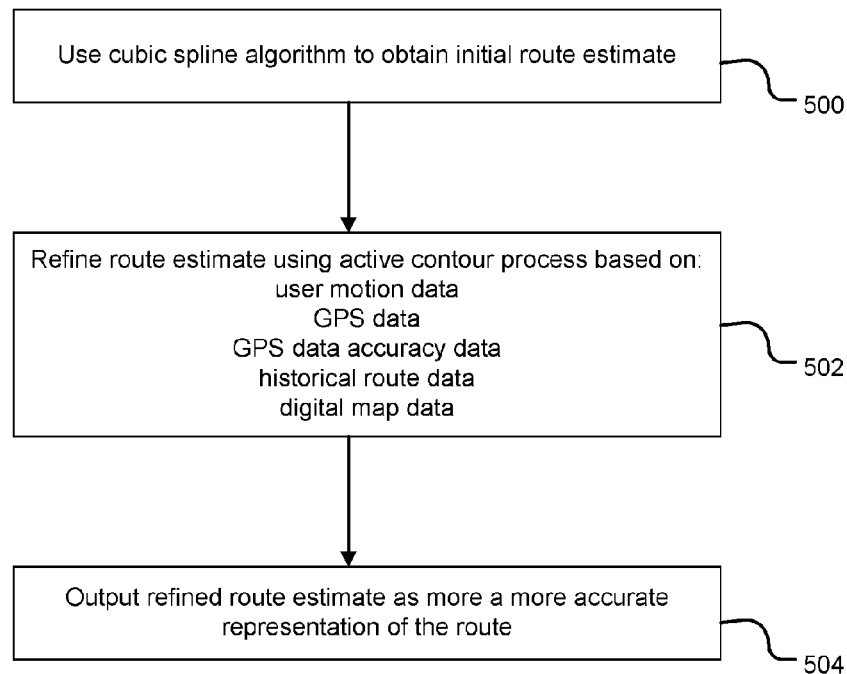
FIG. 5 is a block diagram view illustrating the main stages in the smoothing operation in accordance with a preferred embodiment of the invention.

FIG. 5 is a block diagram view illustrating the main stages in the smoothing operation in accordance with a preferred embodiment of the invention.

In a first stage 500 a cubic spline algorithm is used to obtain an estimate of the representation of the route travelled using the received time stamped GPS position data. This estimate of the route may be a two or three dimensional estimate of the route, and is in the form of a cubic spline curve. The cubic spline algorithm may be any cubic spline curve fitting algorithm known in the art. The resulting cubic spline curve is formed from a plurality of segments connected to one another such that the first and second derivatives of the curve are continuous. The curve segments are joined to one another at "knots". Depending upon the form of the cubic spline algorithm, the shape of the curve may be additionally or alternatively defined by control points which will be located off the curve. If a Bezier cubic spline algorithm is used, then the curve will be so defined. In a preferred embodiment the spline algorithm is a B-spline algorithm. The resulting curve will then have segments connected by knots, with the curve also being defined by control points located off the curve. The cubic spline curve defines a position in time. The number of knots or control points of the curve will be lower than the number of points in the initial GPS data.

In one exemplary embodiment the cubic spline function is applied to all of the GPS position data points, although it could be applied only to selected e.g. sampled ones of the points. In one exemplary embodiment the spline algorithm was weighted according to the position error in the GPS positions, e.g. by $w(t)=1/\max(1, EHPE(t))$. The GPS position data, which, for two dimensional embodiments, is in the form of longitudinal and latitudinal coordinates in geographical degrees, is first projected on to a metric system, with the position in each dimension being expressed in terms of an offset in meters from a given origin.

It will be appreciated that this first stage 500 of the smoothing operation is performed using only the GPS position data and associated time data. Once the cubic spline curve providing the initial estimate of the route travelled has been obtained, in a second stage of the smoothing operation the estimated curve is subjected to a refinement process.

In the refinement process, the cubic spline curve i.e. initial route approximation, is subjected to an active contour process arranged to cause the curve to conform preferentially to a shape and/or position that is more likely to correspond to the travelled route. The curve is caused to move toward the more likely shape/position and/or to move away from less likely shapes/positions. As known in the art, an active contour process provides a way of causing a curve to conform more closely to a desired shape/position (i.e. configuration). This is achieved by associating energy levels with different potential positions/shapes of the curve, wherein a higher energy is associated with less desirable positions/shapes, and a lower energy is associated with more desirable positions/shapes. By minimizing the energy associated with the cubic spline, the spline curve may be caused to conform more closely to the desired profile.

In the refinement process 502, the cubic spline curve i.e. the initial route estimate, is subjected to an active contour process in which at least the user motion data and/or data relating to the accuracy of the position data are used to cause the curve to conform preferentially to a shape/position more likely to correspond to the route travelled. In the embodiment described, the GPS position data is additionally used. As indicated in stage 502 of FIG. 5, in addition historical route data and digital map data may be used. This stage indicates all of the factors which may be used in the refinement process. In all embodiments user motion data and/or position data accuracy data are used, and an embodiment of the refinement process based on these parameters will be described first.

Various types of user motion data may be taken into account in this process. In preferred embodiments at least the speed (SOG) and direction (COG) data is used. In embodiments additional data may be used in the form of accelerometer data (ACC) from an accelerometer or pedometer. For the position data accuracy information, EHPE data is preferably used, although 4th satellite signal strength (RSSI) may alternatively or additionally be used. As a minimum, the process may be carried out only using user motion data, and then desirably the speed and direction data are used.

Figure 6:
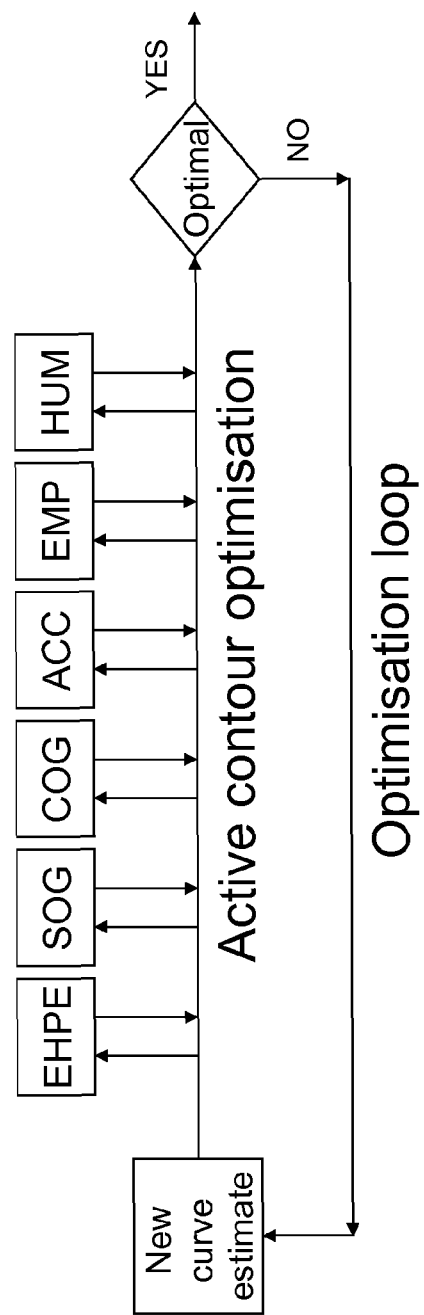
FIG. 6 illustrates one embodiment of a refinement stage of the smoothing operation in more detail.

One example of a refinement process using user motion data, position data and position data accuracy data is shown in FIG. 6. In this exemplary embodiment, a range of different types of user motion and position data error information are used. Thus the process involves an optimization loop which has inputs: EHPE (estimated position error); SOG; COG; ACC; and EMP. ACC may be in the form of a frequency of the accelerometer. It will be appreciated that these data inputs are merely exemplary, and more or less inputs may be used in order to take into account alternative or additional types of user motion data and/or position data error information.

The data is used in an active contour optimization process for the curve shape and/or position as outlined above. In the refinement process 502, the curve is caused to conform to a shape and/or position which minimizes the difference between received user motion and/or position data error values and the corresponding values derivable from the cubic spline curve. This is achieved by assigning an energy to each data type that is taken into account, with the energy being a measure of the difference between the received values of the data and the corresponding values obtainable from the curve. Thus a larger energy will be associated with positions/shapes of the curve that result in values of the data derivable from the curve that are more different to the corresponding received i.e. measured values than will be associated with positions/shapes of the curve that result in derived values closer to the received values. In this way, by minimizing the energy associated with the curve, a shape/position of the curve is found that minimizes the difference between the values of the data types obtainable from the curve and those actually received i.e. measured. This process may be assumed to therefore cause the curve to more closely conform to the actual route taken.

In embodiments, the energy equation used in the active contour process is made up of a contribution for each data type taken into account, with the energy component for each data type being representative of the difference between the value of the data determinable from the curve and the measured/received value. By way of example, an energy equation taking into account contributions from position data, and Doppler speed and direction data might be as follows:

$$\text{Energy} = k_{position} * E_{position} + k_{doppler} * E_{doppler} + \text{etc}$$

Further contributions to the energy equation may be included for contributions of other data types e.g. accelerometer data, EHPE data, etc.

Each component of the energy equation is based on a measure of the difference between the received value of the data or that derivable from received data, and the corresponding value indicated by the determined cubic spline curve.

By way of example, the energy equation includes a contribution determined by the difference between the received position data and that derivable from the curve. This position energy $E_{position}$ measures how far the longitudinal and latitude measurements present in the received GPS data are from the corresponding spline x, y position for the corresponding time. The position energy is weighted by reference to EHPE (reported position error). By way of example, $E_{position}$ = sum_for_t (distance(spline(t), GPS_pos (t))*w(t)), where w(t)=1/max(1, EHPE(t)).

Figure 7:
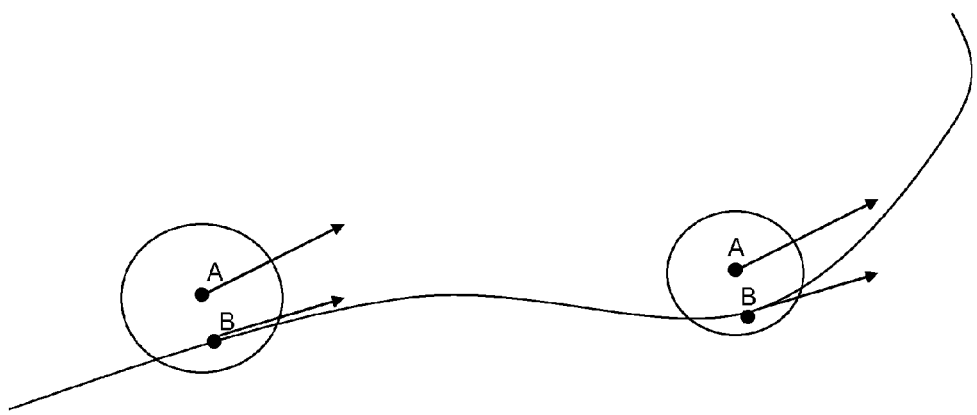
FIG. 7 illustrates the relationship between the received data and data derivable from the estimate of the route.

It will be appreciated that values for the different data types may readily be determined from the spline curve. For example, speed and direction may be determined by consideration of the vector obtainable from the spline which indicates position against time. The way in which such information may be obtained from the curve and a measured GPS point is illustrated in FIG. 7, which shows the vector from which SOG and COG may be derived for both a measured i.e. received GPS data point A, and the corresponding point on the curve B. Alternatively, the speed and heading could be determined in other ways from the spline curve, e.g. by consideration of delta between spline positions for consecutive seconds.

Other types of data which may be taken into account include a distance travelled value. Distance travelled may be determined from the cubic spline curve using any suitable technique, such as consideration of delta distance (summing the distance between individual locations) or "SOG" (summing the integral of speed between individual locations). Corresponding measured/received distance information may be obtained from the pedometer data (EMPED) or from a similar calculation based on the received GPS e.g. position or SOG data. Similarly, data obtained from other human body dynamic motion sensors, similar to pedometers provide other sources of data which may be compared to data derivable from the curve.

Figure 8:
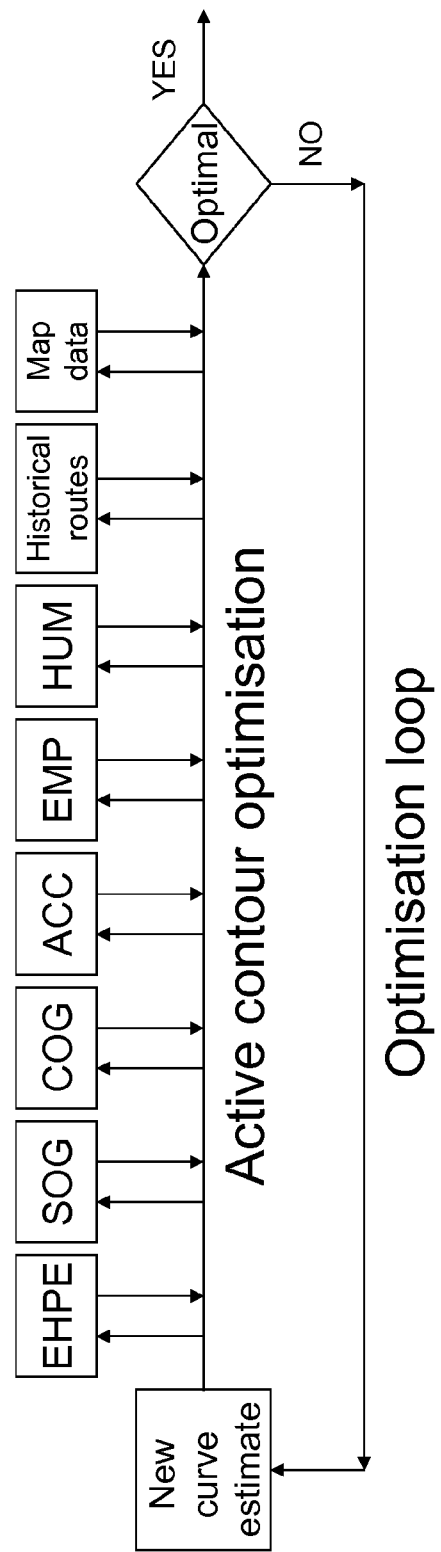
FIG. 8 illustrates another embodiment of a refinement stage of the smoothing operation.

It will be appreciated that in embodiments in which the refinement process uses digital map data or historical route data which are described in more detail below, further components in respect of these parameters are also included in the energy equation as will be shown in FIG. 8.

Returning to the embodiment using user motion data and position data accuracy data, as indicated in FIG. 6, the curve is subjected to refinement by applying the active contour process taking into account contributions from EHPE, SOG, COG, ACC and EMP in an iterative process, with a new curve estimate being obtained after each pass through the optimization loop until the curve is deemed optimized. The curve may then be output to a user.

As mentioned above, the cubic spline curve will include multiple segments, usually joined together at knots. In one implementation of the active contour process, a given knot is moved to a number of different positions, and the energy associated with a portion of the curve in the region of the knot calculated for each position. As the knot is moved, so the shape/position of a portion of the curve in the region of the knot will change. The position of the knot providing the lowest energy for the curve portion is then found, and taken to be the refined or optimized position of the knot for this stage of the process 502.

In one example, a specific implementation of the active contour process includes the following steps. In a first pass, a circle of a first radius is defined around each knot and the knot moved to the edge of the circle at 0°, 45°, 90°, 135°, 180°, 225°, 270°, 315° and 360° (although any direction and any number of directions can be used as desired), the energy calculated at each position and the knot moved to the lowest energy position; in a second pass, and only for those knots that were moved, the process is repeated using a circle with a second smaller radius. The process can continue with decreasing radii as needed. The radii chosen can simply be predefined values or can be based on the length of the total route.

It will be appreciated that, unless otherwise constrained, moving a knot may affect not only immediately adjacent curve portions, but also the positions of knots on either side of the knot in question, having an effect on the shape/position of the curve over a significant part of its length. In order to reduce this effect, and localize the effect of moving a knot, in embodiments a "base" may be defined for the cubic spline, that restricts the effect of moving a knot to a limited number of knots around it, e.g. to the next adjacent knots only with further knots being fixed. This may allow the curve to be optimized along its length by considering the optimal position of each knot in turn, or at least selected knots such that each portion of the curve is optimized only once.

Where the optimization process is carried out on a knot by knot basis, the data used in the active contour process to determine the energy associated with the curve will be that data relating to the portion of the curve being considered, i.e. between the next nearest adjacent knots on either side of the knot in question, and the portion of the curve whose position/shape is optimized will be the same portion of the curve.

It will be appreciated that the refinement process described above based on the user motion data, GPS data and position data accuracy data effectively optimizes the curve with respect to certain internal parameters. In some embodiments, the resulting optimized curve after refinement with respect to these parameters as described by reference to FIG. 6 may be taken as the smoothed route approximation for display to a user.

In preferred embodiments, the curve is subjected to further refinement with respect to external factors. Thus, refinement stage 502 may further take into account one or both of historical route data and digital map data.

In embodiments in which historical route information is used to further refine the curve, the curve is caused to more closely conform to shapes/positions which are likely to correspond to the travelled route by consideration of historical route information. This may be achieved by adding further energy components in the active contour process as described by reference to FIG. 8 to additionally cause the curve to conform more closely to established commonly travelled historical route in the vicinity.

To this end, in embodiments using historical route data, the server 400 stores in mass storage device 402 historical route information. The historical route information is in the form of bundles GPS traces which illustrate commonly taken paths. The GPS traces are obtained from data uploaded from other personal portable training devices and is therefore indicative of paths commonly taken by e.g. runners, cyclists etc. Thus it can be assumed that the route to be determined is likely to correspond to such a route if found in the vicinity.

The paths used in the determination of common paths may be calculated from local entropy and stored as an image or vector of bundles. Bundles may be updated on a weekly basis.

In the active contour process, positions of the curve or part thereof corresponding to a commonly taken route determined on the basis of the historical route information are assigned a relatively low energy. This may be done in the same active contour process used to refine the curve with respect to user motion data and/or position data accuracy data, providing additional an driver in the energy equation. This may be readily achieved with knowledge of the geographical position of the historical routes. In this way, the curve may be "pushed" toward the historical paths which may form (part of) the travelled route. Relatively low energy levels may then be assigned to positions corresponding to the position of the historical routes. In this way, the curve may be pushed toward positions/shapes which include or correspond to such lower energy positions. This process may be repeated for each knot.

In preferred embodiments refinement step 502 also takes into account digital map data. As outlined above, the server 400 may store digital map data in the mass data storage means 402. It will be appreciated that a digital map of the region in which the travelled route lies will indicate certain positions which are unlikely to form part of the travelled route. For example, these may include positions corresponding to certain map features such as bodies of water, railway tracks, motorways, footprints of buildings etc. More generally such regions may be referred to as pedestrian non navigable areas. Conversely, certain positions may be revealed which are likely to form part of the travelled route e.g. parks.

In refinement taking into account digital map data, energy values for use in an active contour process are associated with the digital map. The energy values are representative of the probability that certain positions e.g. geographical features will form part of a travelled route. Thus geographical features unlikely to form part of a travelled route are assigned a relatively high energy, and geographical features likely to form part of the route a relatively low energy. It will be appreciated that the process may only involve assigning relatively low energy levels or high energy levels to features represented by the map, such that the energy levels with be relatively low or high compared to surrounding areas which have not been assigned energy levels. Such techniques may be readily implemented using existing map data which, for example, already indicates the position of e.g. building footprints and other relevant map features. The energy information for use in this stage may be stored in association with digital map data by the server 400 e.g. on mass data storage means 402.

When the active contour process is carried out on the cubic spline curve to minimize its energy, the curve is caused to move toward the low energy positions and/or away from the high energy positions, causing it to conform to the positions/shapes more likely to form part of the travelled route on the basis of the digital map data. This technique is advantageous in that it does not prevent a route from passing through a building, for example, as this could form part of a route taken by a pedestrian, but will help to move the route away from a building where GPS inaccuracies have provided position data lying within a building footprint. This may be done in the same active contour process used to refine the curve with respect to user motion data and/or position data accuracy data, providing additional an driver in the energy equation.

It will be appreciated that the smoothing operation includes refinement using at least the user motion data and/or position data accuracy data. It may additionally include refinement using the historical route data and digital map data. It will be appreciated that each additional factor taken into account during refinement will necessitate additional processing resources and processing time. The level of refinement may be selected as desired given the context and any processing constraints. Where refinement is carried out additionally in respect of historical route data or digital map data, this is advantageously carried out in the same stage, and most preferably active contour process, used to refine the curve with respect to user motion data and/or position data accuracy data.

Refinement with respect to historical route data and digital map data be implemented by adding two further inputs to the active contour process shown in FIG. 6. An example of such a process including these additional stages is shown in FIG. 8. It will be seen that the historical route information e.g. cluster and map data provide two further inputs to the process which may be used as described above to provide additional drivers in the active contour process. Such further inputs add further components to an energy equation which also includes components resulting from the internal factors described above. It is envisaged that alternatively the active contour process may be carried out in a subsequent stage or stages with respect to the further factors, rather than using these as inputs to a single energy equation.

Once the curve has been subject to whatever refinement is required for it to be deemed "optimized" for a given application, it is output as the smoothed route or more accurate representation of the route-step 504 in FIG. 5. In embodiments the server 400 causes the route to be displayed to a user superimposed on a digital map of the region. This may be done via a web page. The digital map data may be obtained from the mass data storage means 402 of the server.

When the route is displayed to the user, it is desirable that a digital map is displayed underneath the route which shows changes in elevation along the route. This elevation information could correspond to received GPS elevation data or may be smoothed data obtained from the smoothed route approximation where this was determined in 3 dimensions. Most preferably a blend of both values is used to reduce the impact of inaccuracies in either data set.

It is envisaged that rather than carrying our refinement of the curve using user motion data and/or position data accuracy data, such refinement could be carried using historical route data and/or digital map data and not user motion data and/or position data accuracy data. This may be achieved in a similar manner to the embodiments described herein, using an active contour process, but without inputs based on the user motion data and/or position data accuracy data.

It will also be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

For example, whilst embodiments described in the foregoing detailed description refer to GPS, it should be noted that the navigation device and system may utilise any kind of position sensing technology as an alternative to (or indeed in addition to) GPS. For example, the navigation device may utilise other global navigation satellite systems, such as the European Galileo system. Equally, it is not limited to satellite-based systems, but could readily function using ground-based beacons or other kind of system that enables the device to determine its geographic location.

It will also be well understood by persons of ordinary skill in the art that whilst the preferred embodiment may implement certain functionality by means of software, that functionality could equally be implemented solely in hardware (for example by means of one or more SICs (application specific integrated circuit)) or indeed by a mix of hardware and software.

Lastly, it should be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specially enumerated in the accompanying claims at this time.

The invention claimed is:

1. A method of generating a representation of a route traveled by a user, the method comprising:
receiving position data relating to the position of the user at a plurality of times when traveling along the route;
obtaining first additional data comprising at least one of:
historical route data indicative of previous routes traveled by the user and/or other users; and digital map data, based on the received position data;
performing a smoothing operation on the received position data to generate a more accurate representation of the route, wherein the smoothing operation comprises:
applying a spline algorithm to the received position data to obtain an estimated representation of the route in the form of a spline curve; and
refining the estimated representation of the route using the first additional data; and
providing the generated representation of the route, or data representative thereof, to a device for display to the or another user.

2. The method of claim 1, wherein the digital map data comprises at least one of building footprints and bodies of water.

3. The method of claim 1, further comprising receiving second additional data comprising at least one of: user motion data relating to the motion of the user at a plurality of times when traveling along the route; and data relating to the accuracy of the received position data, and wherein the refining of the estimated representation of the route uses the first and second first additional data.

4. The method of claim 3, wherein the second additional data comprises user motion data relating to the motion of the user at a plurality of times when traveling along the route, and wherein the user motion data includes at least one of speed and direction data.

5. The method of claim 3, wherein the second additional data comprises data relating to the accuracy of the received position data, and wherein the data relating to the accuracy of the received position data comprises at least one of satellite signal strength information and expected position errors.

6. The method of claim 1, wherein the refining the estimated representation of the route comprises minimizing or reducing an energy associated with the estimated representation of the route in an active contour process in respect of at least a portion of the spline curve.

7. The method of claim 6, wherein the first additional data comprises historical route data indicative of previous routes traveled by the user and/or other users, and wherein said energy is influenced by the position of a portion of an historical route relative to at least a part of the spline curve.

8. The method of claim 7, wherein the refining the estimated representation of the route comprises modifying the spline curve to preferentially correspond more closely to a shape and/or position having a higher probability of representing the actual route traveled, wherein the shape and/or position having a higher probability of representing the actual route traveled is a shape and/or position corresponding at least in part to a portion of an historical route.

9. The method of claim 6, wherein the first additional data comprises digital map data, and wherein said energy is influenced by the position of certain geographical features represented by the digital map relative to at least a part of the spline curve.

10. The method of claim 9, wherein the refining the estimated representation of the route comprises modifying the spline curve to preferentially conform: more closely to a shape and/or position having a higher probability of representing the actual route traveled; and/or less closely to a shape and/or position having a lower probability of representing the actual route traveled, wherein said shape and/or position is determined at least in part on the basis of geographical features represented by the digital map data.

11. The method of claim 3, wherein the refining the estimated representation of the route comprises minimizing or reducing an energy associated with the estimated representation of the route in an active contour process in respect of at least a portion of the spline curve.

12. The method of claim 11, wherein the second additional data comprises user motion data relating to the motion of the user at a plurality of times when traveling along the route, and wherein said energy is influenced by a measure of a difference between the received user motion data and corresponding data derived from the spline curve.

13. The method of claim 1, wherein the position data is received from location determining and tracking elements of a portable training device arranged to be transported, carried or worn by the user, and wherein the location determining and tracking elements comprise a global navigation satellite systems (GNSS) receiver.

14. The method of claim 1, wherein the providing the generated representation of the route, or data representative thereof, to a device for display to the or another user comprises causing the generated representation of the route to be displayed to a user on a digital map, optionally via a web page.

15. A system for generating a representation of a route traveled by a user, comprising:
   a processor; and
   a memory;
   the processor and memory configured to:
      receive position data relating to the position of the user at a plurality of times when traveling along the route;
      obtain first additional data comprising at least one of:
         historical route data indicative of previous routes traveled by the user and/or other users; and digital map data, based on the received position data;
      perform a smoothing operation on the received position data to generate a more accurate representation of the route, wherein the smoothing operation comprises:
         applying a spline algorithm to the received position data to obtain an estimated representation of the route in the form of a spline curve; and refining the estimated representation of the route using the first additional data; and
      provide the generated representation of the route, or data representative thereof, to a device for display to the or another user.

16. A non-transitory computer readable medium comprising computer readable instructions that, when executed by one or more processors of a system, cause the system to perform a method for generating a representation of a route traveled by a user, the method comprising:
   receiving position data relating to the position of the user at a plurality of times when traveling along the route;
   obtaining, based on the received position data, first additional data comprising at least one of historical route data indicative of previous routes traveled by the user and/or other users and digital map data;
   performing a smoothing operation on the received position data to generate a more accurate representation of the route, wherein the smoothing operation comprises:
      applying a spline algorithm to the received position data to obtain an estimated representation of the route in the form of a spline curve; and
      refining the estimated representation of the route using the first additional data; and
   providing the generated representation of the route, or data representative thereof, to a device for display to the or another user.

* * * * *